United States Patent
Wong

(10) Patent No.: US 9,103,150 B1
(45) Date of Patent: Aug. 11, 2015

(54) LOCKING HINGE FOR CONVERTIBLE STAND/TABLE

(71) Applicant: Helping Hands International Holdings Limited, Tortola (VG)

(72) Inventor: Chi Shing Wong, Hong Kong (CN)

(73) Assignee: Helping Hands International Holdings Limited (VG)

( * ) Notice: Subject to any disclaimer, the term of this patent is extended or adjusted under 35 U.S.C. 154(b) by 0 days.

(21) Appl. No.: 14/308,621

(22) Filed: Jun. 18, 2014

(51) Int. Cl.
*E05D 7/00* (2006.01)
*E05D 11/10* (2006.01)

(52) U.S. Cl.
CPC .............. *E05D 11/1007* (2013.01); *E05D 7/00* (2013.01); *E05Y 2201/216* (2013.01)

(58) Field of Classification Search
CPC ..... E05D 11/06; E05D 11/10; E05D 11/1007; E05D 11/1078; E05D 11/1028; E05D 3/122; E05Y 2900/606; E05Y 2201/46; E05Y 2201/462; A47B 23/043; A47B 23/044; G06F 1/1679; G06F 1/1681
USPC ........... 16/354, 320, 324, 326, 343, 345, 347, 16/349–352; 248/127, 128, 133, 136–139, 248/140, 142, 188, 188.6, 274.1, 276.1, 248/917, 919, 921, 922; 280/642, 47.371, 280/650, 655.1; 403/93, 96, 95, 97, 99, 403/101, 104, 108, 321, 322.4, 322.3, 324, 403/326
See application file for complete search history.

(56) References Cited

U.S. PATENT DOCUMENTS

| | | | | |
|---|---|---|---|---|
| 4,614,452 | A * | 9/1986 | Wang | 403/27 |
| 5,520,474 | A * | 5/1996 | Liu | 403/97 |
| 5,779,209 | A * | 7/1998 | Rello | 248/278.1 |
| 6,550,801 | B1 * | 4/2003 | Newhard | 280/642 |
| 6,629,801 | B2 * | 10/2003 | Cheng | 403/101 |
| 6,805,513 | B2 * | 10/2004 | Marquina | 403/107 |
| 7,251,896 | B2 * | 8/2007 | Khubani | 30/199 |
| 7,631,575 | B2 * | 12/2009 | Gard et al. | 74/530 |
| 8,310,468 | B2 * | 11/2012 | Martin | 345/204 |
| 8,387,938 | B2 * | 3/2013 | Lin | 248/456 |
| 2002/0131814 | A1 * | 9/2002 | Hou et al. | 403/97 |
| 2004/0179891 | A1 * | 9/2004 | Watkins et al. | 403/96 |

(Continued)

OTHER PUBLICATIONS

"Levo Deluxe eBook and iPad Holder Floor Stand," https://web.archive.org/web/20130506103550/http://www.brookstone.com/levo-deluxe-ebook-and-ipad-holder-floor-stand? (May 6, 2013).

(Continued)

*Primary Examiner* — Chuck Mah
(74) *Attorney, Agent, or Firm* — Middleton Reutlinger

(57) ABSTRACT

A locking hinge design relies on a mechanically-actuated magnetic clutch to selectively disengage first and second gears respectively coupled to first and second members and thereby selectively enable relative rotation between the first and second members about an axis of rotation. The mechanically-actuated magnetic clutch includes first and second magnetic members disposed in an opposing relationship, such that permanent magnets respectively disposed in each magnetic member may be placed into either a mutually attractive or mutually repellant relationship in response to relative movement therebetween. One of the magnetic members is coupled to one of the gears to move the gear along the axis of rotation and thereby selectively disengage or engage the gear from or with the other gear such that the gears are selectively engaged in response to mechanical movement of the magnetic members.

20 Claims, 15 Drawing Sheets

(56) References Cited

U.S. PATENT DOCUMENTS

| | | | |
|---|---|---|---|
| 2007/0212166 A1* | 9/2007 | Rudduck | 403/324 |
| 2008/0109994 A1* | 5/2008 | Liao | 16/319 |
| 2013/0044454 A1* | 2/2013 | Lin et al. | 361/807 |
| 2013/0175264 A1* | 7/2013 | Lin | 220/4.22 |

OTHER PUBLICATIONS

"Ikea Dave Laptop Table," http://kk.org/cooltools/archives/4620 (Aug. 3, 2010).

"Z3 Tablet Stand," https://web.archive.org/web/20130411053435/http://www.ratstands.com/acatalog/Tablet_stands.html (Apr. 11, 2013).

Richbourg, Smythe, "Flote m2 Tablet Floor Stand review," http://the-gadgeteer.com/2013/11/25/flote-m2-tablet-floor-stand-review/ (Nov. 25, 2013).

"SwingHolder, The amazingly versatile floor stand for the iPad," https://web.archive.org/web/20120129172615/http://www.standforstuff.com/index.jsp (Jan. 29, 2012).

"TabletTail: Monkey Kit," https://web.archive.org/web/20130403040549/https://www.octa.com/products/monkey-kit.html (Apr. 3, 2013).

"The iPad Charging Floor Stand," https://web.archive.org/web/20131120123058/http://www.hammacher.com/Product/Default.aspx?sku=83721 (Nov. 20, 2013).

* cited by examiner

LOCKING HINGE FOR CONVERTIBLE STAND/TABLE

CROSS-REFERENCE TO RELATED APPLICATIONS

This application is related to the following applications, each of which filed on even date herewith and incorporated by reference in its entirety: U.S. patent application Ser. No. 14/308,609, filed by Chi Shing Wong et al. and entitled "CONVERTIBLE STAND/TABLE;" and U.S. patent application Ser. No. 14/308,623, filed by Chi Shing Wong and entitled "MAGNETIC BALL JOINT FOR CONVERTIBLE STAND/TABLE."

BACKGROUND

Portable electronic devices have become increasingly popular for both personal and commercial use. For example, tablet computers, or simply tablets, are increasing used for tasks such as surfing the internet, checking email, reading e-books, playing games, running apps, watching video content, listening to audio content, and video conferencing, among others. Tablets, however, can be relatively heavy to hold, particularly for long periods of time, and with the increasing use of tablets, there have been increasing incidents of pain and/or injury due to prolonged tablet use. Poor posture while using a tablet can lead to neck or back strain, and extended holding of a tablet can lead to repetitive strain injuries in the arms and/or hands. Similar problems exist for other types of portable electronic devices such as electronic readers and mobile phones, as well as printed materials such as books, newspapers and magazines.

As a result of these concerns, some individuals rely on a tablet stand or holder when using a tablet. A variety of tablet stand designs are available, including desktop and floor designs. Conventional tablet stands, however, suffer from a number of drawbacks. For example, many conventional tablet stands are designed purely based upon mechanical concerns, rather than aesthetic concerns. In addition, given that floor stands are by necessity relatively large, such floor stands are not easily hidden away when not in use, thus forcing some individuals to leave an unattractive floor stand sitting in their living space at all times. Some designs, in particular, are designed such that the mechanical components that hold the tablet to the stand are effectively hidden behind the tablet when the tablet is held by the stand, and as a result, some stand designs can be even less attractive when no tablet is held by the stand.

In addition, given that an individual may wish to use a tablet in a variety of locations, many tablet stand designs are adjustable, e.g., to enable a tablet to be used while standing, while sitting in a chair, while sitting or laying on a sofa, or while sitting or laying in a bed. Adjustments to conventional tablet stand designs, however, are often cumbersome and time consuming, since the adjustments may involve complex interactions such as loosening and retightening adjustment knobs, extending or shortening variable length arms, etc. Furthermore, many conventional designs enable users to adjust a stand to positions that are not ergonomically acceptable, potentially leading to many of the same concerns associated with hand-held tablets.

The manner in which a tablet is held by a stand may also be problematic in some designs. Many designs rely on opposing grips that retain a tablet along one or more edges. While such designs can securely hold a tablet, in practice such designs may be cumbersome to adjust to accommodate multiple differently-shaped devices and/or may be difficult to insert or remove a tablet or other device.

Therefore, a substantial need exists in the art for a tablet stand design that is aesthetically pleasing both when in use with a tablet and when not in use, that is easily adjustable between various ergonomically-friendly designs, and that can readily accept multiple differently-shaped devices.

SUMMARY

The embodiments disclosed herein provide in one aspect a locking hinge design that is suitable for use in a convertible stand/table as well as in other applications, and that relies on a mechanically-actuated magnetic clutch to selectively disengage first and second gears respectively coupled to first and second members and thereby selectively enable relative rotation between the first and second members about an axis of rotation. The mechanically-actuated magnetic clutch includes first and second magnetic members disposed in an opposing relationship, such that permanent magnets respectively disposed in each magnetic member may be placed into either a mutually attractive or mutually repellant relationship in response to relative movement therebetween. One of the magnetic members is coupled to one of the gears to move the gear along the axis of rotation and thereby selectively disengage or engage the gear from or with the other gear such that the gears are selectively engaged in response to mechanical movement of the magnetic members.

Therefore, consistent with one aspect of the invention, a locking hinge includes first and second members coupled to one another for relative rotation about an axis of rotation, a first gear coupled to the first member for rotation therewith about the axis of rotation, and a second gear coupled to the second member for rotation therewith about the axis of rotation and disposed in an opposing relationship with the first gear, where the second gear is further movable along the axis of rotation between first and second gear positions, and where in the first gear position the first and second gears are intermeshed with one another to restrict relative rotation between the first and second members, and in the second gear position the first and second gears are separated from one another to allow for relative rotation between the first and second members. The locking hinge also includes a magnetic clutch including first and second magnetic members disposed in an opposing relationship, with each magnetic member including at least one permanent magnet, the first magnetic member being moveable relative to the second magnetic member between first and second clutch positions, the second magnetic member coupled to the second gear to move the second gear between the first and second gear positions, where in the first clutch position of the first magnetic member, the first and second magnetic members are mutually repellant such that the second magnetic member moves the second gear into the first gear position to restrict relative rotation between the first and second members, and in the second clutch position of the first magnetic member, the first and second magnetic members are mutually attractive such that the second magnetic member moves the second gear into the second gear position to allow for relative rotation between the first and second members.

Consistent with another aspect of the invention, an apparatus includes a base, an arm supported by the base and comprising a plurality of arm segments, a head including a top surface, the head pivotably mounted to the arm at an opposite end from the base, the head being pivotable to a position inclined relative to horizontal and configured to support a portable electronic device in an ergonomically-suitable viewing position, and a remotely-actuatable locking hinge coupling first and second arm segments among the plurality of arm segments to one another in response to actuation of a handle coupled to the head. The locking hinge includes first and second members respectively coupled to the first and second arm segments and coupled to one another for relative rotation about an axis of rotation, a first gear coupled to the first member for rotation therewith about the axis of rotation, a second gear coupled to the second member for rotation therewith about the axis of rotation and disposed in an opposing relationship with the first gear, where the second gear is further movable along the axis of rotation between first and second gear positions, and where in the first gear position the first and second gears are intermeshed with one another to restrict relative rotation between the first and second members, and in the second gear position the first and second gears are separated from one another to allow for relative rotation between the first and second members, and a mechanically-actuated magnetic clutch mechanically coupled to the handle and including first and second magnetic members disposed in an opposing relationship. Each magnetic member includes at least one permanent magnet, where the first magnetic member is moveable relative to the second magnetic member between first and second clutch positions in response to actuation by the handle, the second magnetic member coupled to the second gear to move the second gear between the first and second gear positions, where in the first clutch position of the first magnetic member, the first and second magnetic members are mutually repellant such that the second magnetic member moves the second gear into the first gear position to restrict relative rotation between the first and second members, and in the second clutch position of the first magnetic member, the first and second magnetic members are mutually attractive such that the second magnetic member moves the second gear into the second gear position to allow for relative rotation between the first and second members.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

DETAILED DESCRIPTION

Figure 1:
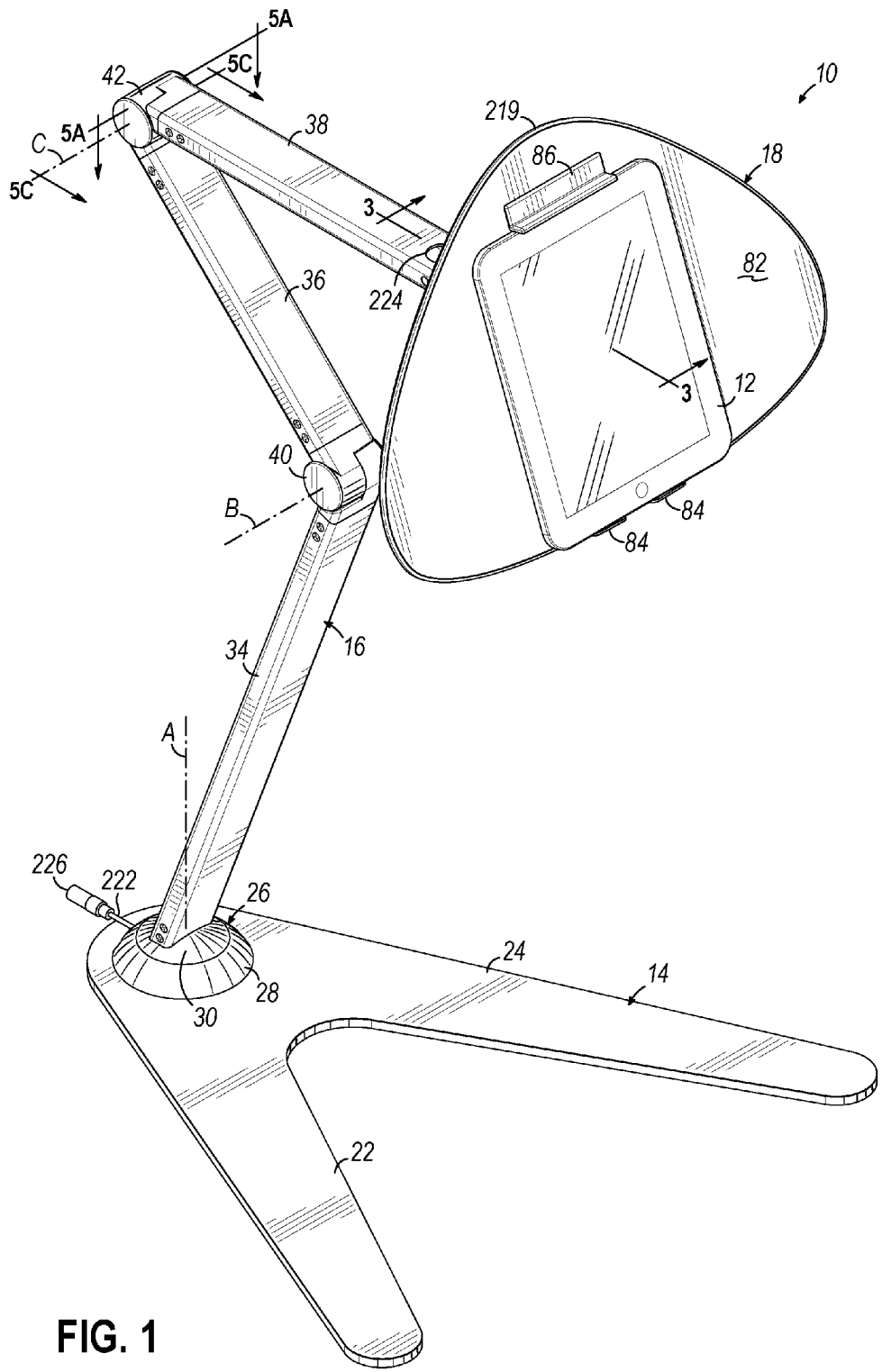
FIG. 1 is a perspective view of a convertible stand/table consistent with the invention in a stand configuration, with a tablet mounted thereto.

Embodiments consistent with the invention are directed in part to a convertible stand/table that is capable of being converted for use alternately as a table or a stand, and in particular, a stand suitable for use in mounting, securing, holding, or otherwise retaining one or more items for viewing and/or use by an individual. In the embodiments discussed hereinafter, for example, focus is on a convertible stand/table that may be used to retain a tablet (also referred to herein as a "tablet computer"); however, it will be appreciated that a convertible stand/table may also be used to retain alternatively and/or additional items, including, for example, other types of portable electronic devices such as mobile phones, electronic readers, etc., as well as other types of non-electronic devices such as books, magazines, newspapers, music sheets, paper documents, etc. By virtue of the flexibility of the herein-described embodiments, a wide variety of items may be retained in different embodiments, and accordingly, the invention is not limited to the particular types of items that are retained by any particular embodiment of a convertible stand/table consistent with the invention. Further, while the discussion hereinafter focuses on use with a tablet or tablet computer, it will be appreciated that a convertible stand/table consistent with the invention may have use with a wide variety of other portable electronic devices, so the invention is not limited as such.

As will become more apparent below, a convertible stand/table consistent with the invention may be moved, adjusted or otherwise reconfigured between a table configuration and a stand configuration. When in the table configuration, a convertible stand/table presents a generally horizontal table surface capable of additionally retaining items, but generally using only gravity, rather than any additional retaining functionality. When in a stand configuration, however, items may be retained in a position suitable for presenting those items for use and/or viewing relative to a user's current position and/or orientation, e.g., when standing, sitting, reclining, laying down, etc., as well as when the user is sitting or laying down on various types of furniture, e.g., chairs, sofas, recliners, beds, etc. It will be appreciated that when a convertible stand/table is configured in a table configuration, the convertible stand/table may function effectively as various types of furniture, e.g., a table, a side table, an end table, a nightstand, a coffee table, a food tray, a sitting desk, a standing desk, a breakfast table, a plant stand, etc.

As will also become more apparent below, a convertible stand/table consistent with the invention may, in some embodiments, be reconfigurable between a plurality of ergonomically-suitable positions, thereby encouraging a user to use the convertible stand/table in a manner that is less likely to lead to pain and/or injury when viewing or using an item retained by the convertible stand/table. In other embodiments, no such restrictions may be made on the configurable positions enabled by a convertible stand/table consistent with the invention.

In addition, as will be discussed in greater detail below, a convertible stand/table may incorporate one or more locking hinges that may be selectively released to adjust the convertible stand/table between a plurality of ergonomically-suitable positions. In some embodiments, each locking hinge relies on a mechanically-actuated magnetic clutch to selectively disengage first and second gears respectively coupled to first and second members and thereby selectively enable relative rotation between the first and second members about an axis of rotation, which in some embodiments are respectively coupled to arm segments of a convertible stand/table. The mechanically-actuated magnetic clutch includes first and second magnetic members disposed in an opposing relationship, such that permanent magnets respectively disposed in each magnetic member may be placed into either a mutually attractive or mutually repellant relationship in response to relative movement therebetween. One of the magnetic members is coupled to one of the gears to move the gear along the axis of rotation and thereby selectively disengage or engage the gear from or with the other gear such that the gears are selectively engaged in response to mechanical movement of the magnetic members.

Furthermore, each locking hinge may, in some embodiments, be both mechanically and remotely actuated, e.g., using a Bowden cable or other mechanical coupling between an actuator, e.g., a handle, disposed on a head of a convertible stand/table, and a control member coupled to the magnetic clutch. By doing so, a user may be permitted in some embodiments to conveniently adjust the position of a convertible stand/table by actuating a handle, adjusting the convertible stand/table, and once a desired position is obtained, releasing the handle to return each locking hinge to a locked configuration.

As will also become more apparent below, a convertible stand/table may also incorporate a magnetic ball joint to join a head of the convertible stand/table to the end of an arm thereof. The magnetic ball joint described hereinafter utilizes an array of interleaved magnets and ferromagnetic bodies to both magnetically engage and retain a magnetically-attractive ball using concentrated magnetic force as well as to provide frictional resistance to movement of the ball in the joint.

Other modifications will be apparent to those of ordinary skill in the art having the benefit of the instant disclosure.

Figure 2:
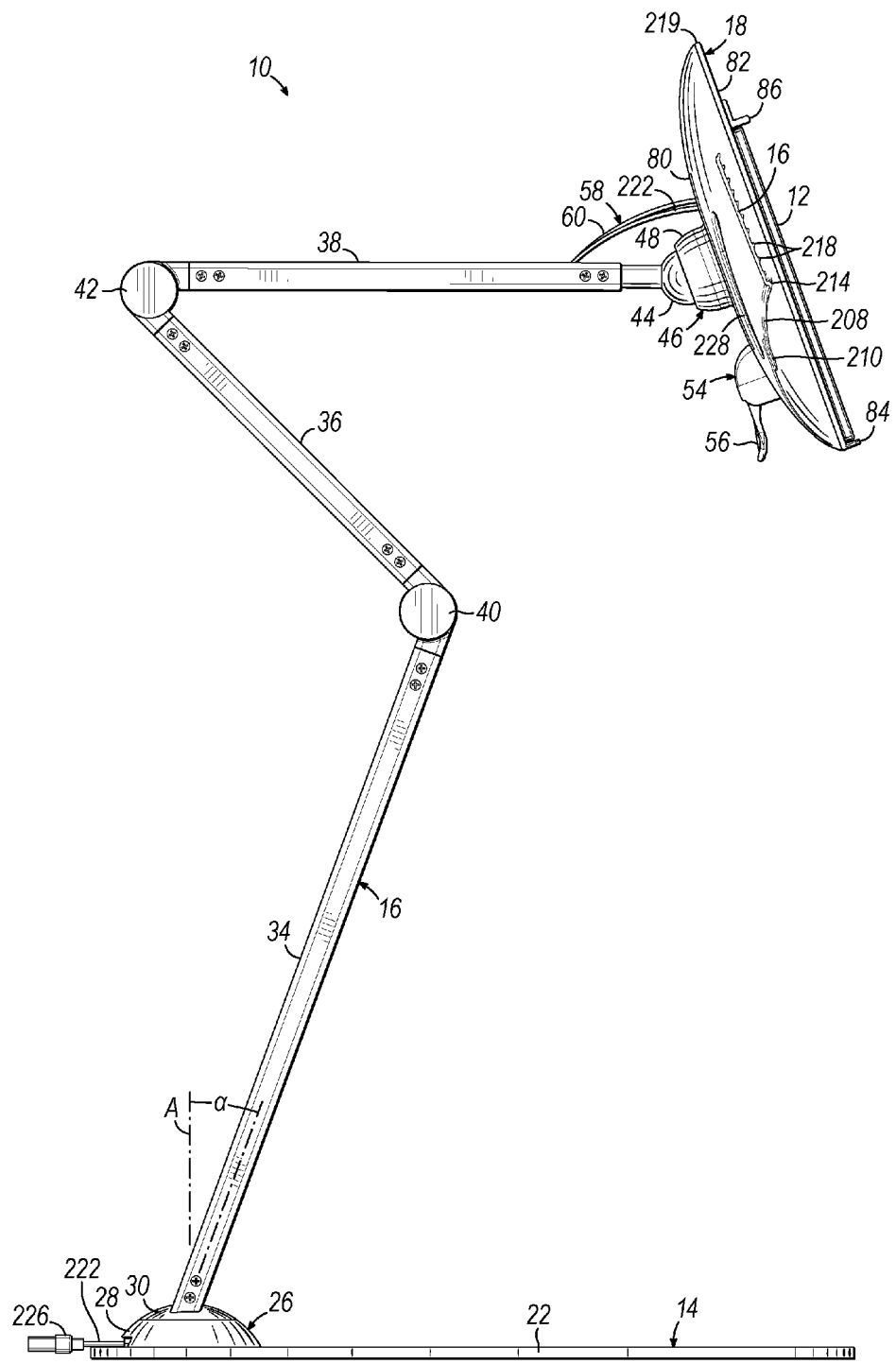
FIG. 2 is a left side elevational view of the convertible stand/table of FIG. 1.

Turning now to the drawings, wherein like numbers denote like parts throughout the several views, FIGS. 1-2 illustrate an example of convertible stand/table 10 (also referred to hereinafter as a "device") consistent with the invention, and having mounted, secured or otherwise retained thereon a tablet 12. Device 10 includes a base 14, arm 16 and head 18. Base 14 is generally V-shaped with legs 22, 24 projecting forward of a rotatable arm mount 26 to which arm 16 is rotatably mounted to base 14. Rotatable arm mount 26 includes a fixed base portion 28 with a rotatable arm portion 30 configured to rotate relative to the fixed base portion. In the illustrated embodiment, rotatable arm portion 30 may be configured to rotate about an axis A (FIG. 2) that is substantially vertical relative to a ground surface and the base, and over about a 60 degree range, e.g., about 30 degrees in each direction from the position illustrated in FIGS. 1-2. In some embodiments, one or more detents may be incorporated into the rotatable arm mount to restrict free rotation of arm 16 within this range and/or a magnetic arrangement may be used to reduce friction in the mount. For example, a single detent may be provided in some embodiments proximate the center of the range to resist rotation of the arm from a centered rotational position.

In some embodiments, arm 16 includes three segments 34, 36 and 38 pivotably coupled to one another using a pair of hinges 40, 42. Hinges 40, 42 respectively pivot about axes B and C, which in the illustrated embodiment are substantially parallel to one another as well as to a ground surface. Hinge 40 is disposed at an opposite end of arm segment 34 from rotatable arm mount 26, and in the illustrated embodiment, arm segment 34 is mounted at a fixed angular position to rotatable arm portion 30 of rotatable arm mount 26 such that arm segment 34 is fixed at an angle $\alpha$ relative to axis A. In the illustrated embodiment, angle $\alpha$ is about 20 degrees, although other angles may be used in other embodiments, and in still other embodiments, arm segment 34 may be pivotable relative to base 14.

Figure 3:
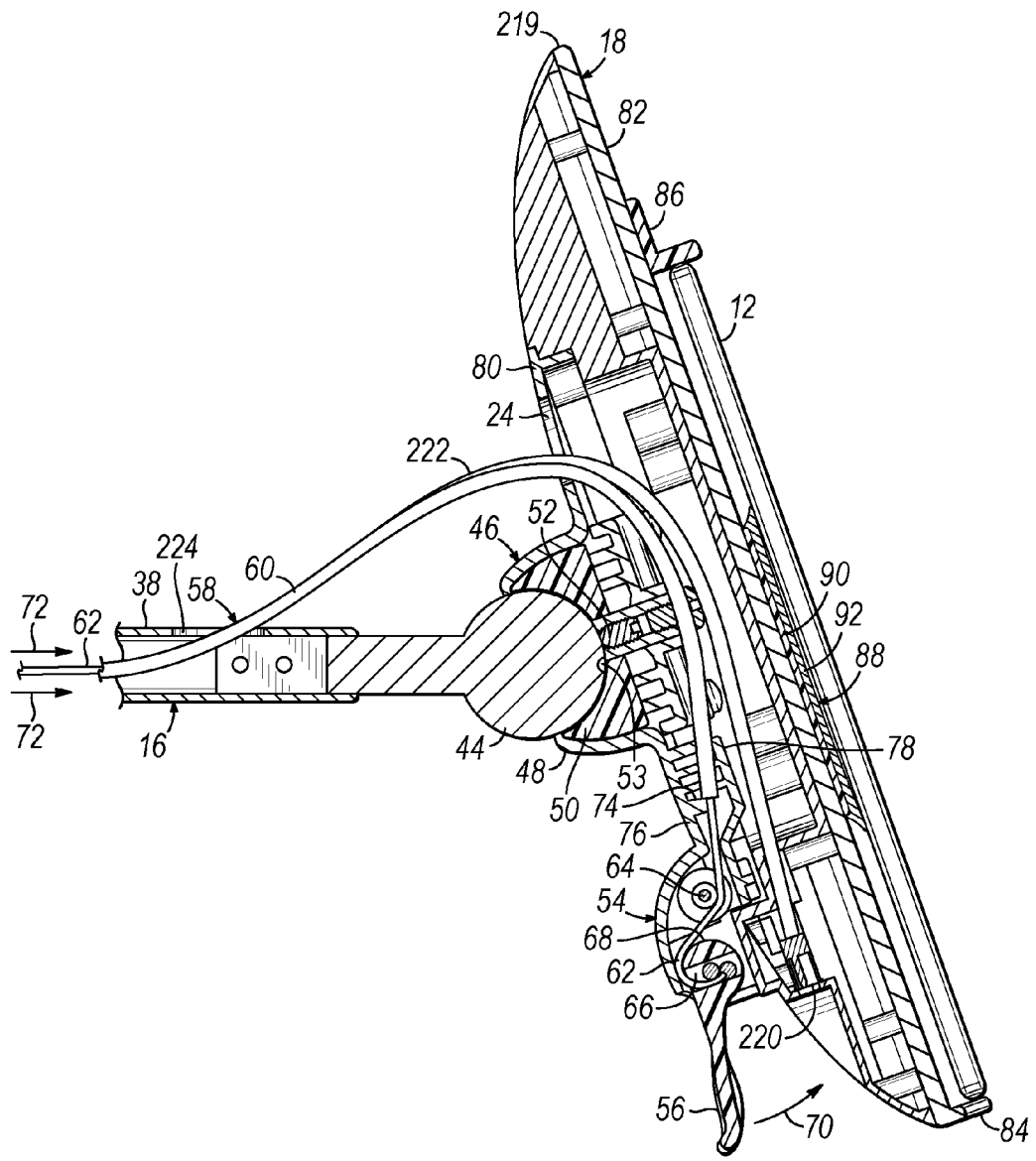
FIG. 3 is a cross-sectional view of a portion of the convertible stand/table of FIG. 1, taken along lines 3-3 thereof.

As best illustrated in FIGS. 2-3 and 3A-3C, at the opposite end of arm segment 38 from hinge 42 is disposed a ball 44 configured to form a ball joint 46 with a cooperative socket 48 on the backside of head 18. Ball joint 46 is configured to permit head 18 to pivot in multiple directions relative to arm segment 38, and in some embodiments, may be configured to restrict movement between only ergonomically-suitable positions. As shown in FIG. 3, ball 44 may include an outer surface defining at least a portion of a spherical body, and at least a portion of the outer surface may be formed of a magnetically-attractive material such as steel. A magnetic assembly 50 may be disposed within socket 48 and configured with a substantially concave surface suitable for circumscribing a portion of ball 44 within socket 48 to attract ball 44 and thereby magnetically engage ball 44 within socket 48 and provide frictional resistance to retain head 18 in a desired position selected by a user.

Figure 3A:
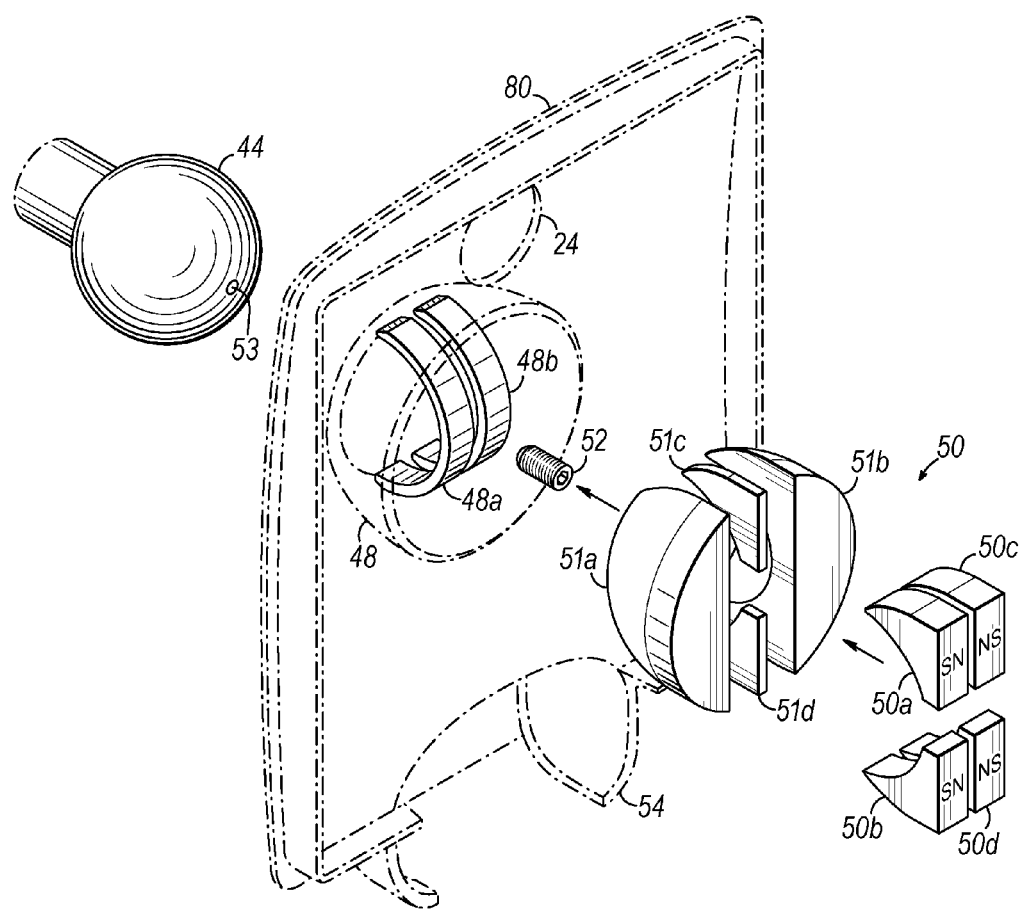
FIG. 3A is an exploded perspective view of the ball joint referenced in FIG. 3, with portions of the head shown in phantom.

As shown in FIG. 3A, In one embodiment, magnetic assembly 50 may include a plurality of permanent magnets 50a-50d and a plurality of ferromagnetic bodies 51a-51d arranged in an array that concentrates or augments the resulting magnetic field in a direction towards ball 44 (thereby increasing the magnetic attraction with the ball), while diminishing or canceling the magnetic field in a direction away from the ball (i.e., outside of the ball joint). In the illustrated embodiment, magnets 50a-50d and bodies 51a-51d are arranged into a linear array of alternating and interleaved groups, with the outer body groups respectively including a single body 51a and 51b, and with the inner body group including two coplanar plates 51c/51d and each magnet group respectively including two coplanar magnets (50a/50b, and 50c/50d). In some embodiments, the arrangement of magnets and/or ferromagnetic bodies may utilize the Halbach effect to concentrate the magnetic force applied to the ball.

Figure 3B:
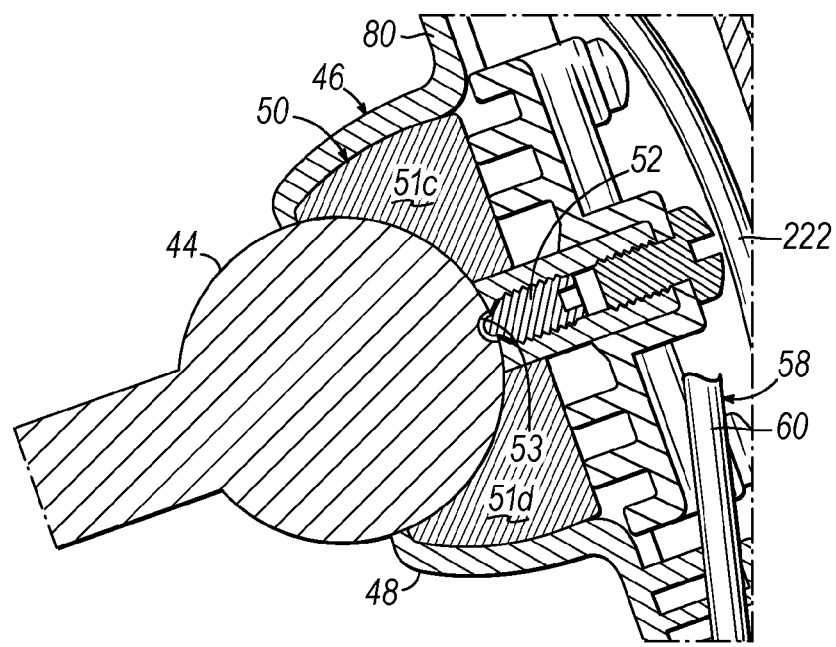
FIG. 3B is a cross-sectional view of the ball joint in FIG. 3, taken along a central plane of the ball joint.
Figure 3C:
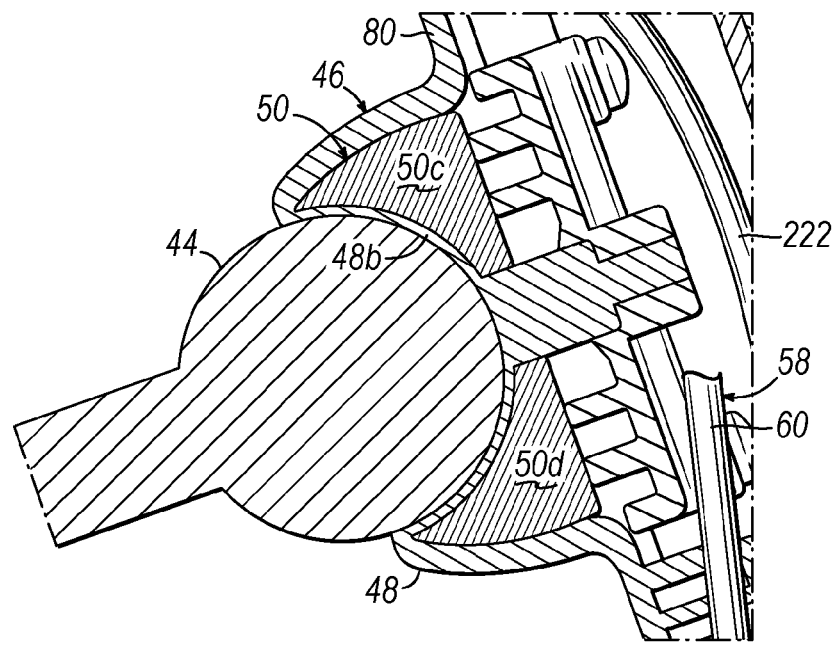
FIG. 3C is a cross-sectional view of the ball joint of FIG. 3, taken along a plane that is laterally offset from the central plane of FIG. 3B.

Magnets 50a-50d and bodies 51a-51d have a collective shape that presents a surface that conforms to that of ball 44; however, a pair of non-magnetic spacers 48a, 48b are defined in socket 48 (e.g., integrally formed via injection molding/ diecasting) and interposed between the ball and magnets 50a-50d such that magnets 50a-50d do not physically contact the outer surface of the ball. Bodies 51a-51d, however, do contact the outer surface of the ball when the ball is engaged by the magnet assembly. FIG. 3B, for example, is taken along a central plane of the ball joint, which is also through plates or bodies 51c and 51d, and it may be seen that each of these bodies is in direct contact with ball 44. FIG. 3C is laterally offset from the view of FIG. 3B, and taken through magnets 50c and 50d, and it may be seen that these magnets do not physically contact ball 44, but are instead separated therefrom by spacer 48b.

In the illustrated embodiment, for example, collectively each body 51a-51d, along with spacers 48a and 48b, defines at least a portion of a spherical cup (e.g., a hemispherical cup) configured to substantially match and contact an outer surface of ball 44. Each body 51a-51d, as well as each spacer 48a, 48b, therefore individually includes at least one substantially concave surface that defines a portion of a spherical zone for a sphere having substantially the same radius as ball 44. Each magnet 50a-50d also includes at least one substantially concave surface that defines a portion of a spherical zone for a sphere; however, the radius of that sphere will have a somewhat larger radius based upon the thickness of spacers 48a-48b. It will be appreciated that any "sphere" defined by the bodies, magnets and/or spacers is generally defined by one or more substantially concave surfaces, and is configured to substantially match the corresponding sphere defined by a substantially convex outer surface of the ball.

As noted above, magnets 50a-d and bodies 51a-d are interleaved and configured to define an array (e.g., based upon the Halbach effect) that concentrates or focuses the magnetic field toward the ball. Each magnet 50a-50d is formed as a permanent magnet, e.g., made of NdFeB or another suitable material for use as a permanent magnet. Each body 51a-d is formed from a ferromagnetic material such as iron or steel, but in the illustrated embodiment, is not itself a permanent magnet. Magnets 50a-50d are magnetized across their respective thicknesses and interposed between pairs of bodies 51a-51d, with the north poles thereof proximate to or facing bodies or plates 51c and 51d, and with the south poles thereof proximate to or facing bodies 51a and 51b. Bodies 51c and 51d effectively short the magnetic field on the north poles of all of the magnets, while bodies 51a and 51b short the magnetic field on the south poles of all of the magnets. Doing so effectively concentrates and maximizes the magnetic fields along the interfaces between bodies 51c and 51d and the magnets 50a-50d. In other embodiments, the arrangement of magnetic poles may be reversed, such that the south poles of the magnets face bodies or plates 51c and 51d.

It will also be appreciated that bodies 51c/51d and magnets 50a/50b and 50c/50d in the illustrated embodiment are substantial mirror images of one another, and have the same polarity from the perspective of the array, but are otherwise physically separate from one another and roughly half the length in a vertical direction as bodies 51a and 51b, in part to provide space through which a ball head screw may project (see below). In other embodiments, however, these pairs of bodies or magnets may be replaced by single bodies or magnets that have a similar length as bodies 51a and 51b, thereby reducing the number of bodies and magnets to five. It will be appreciated that different numbers of magnets and/or bodies and/or orientations of magnets may be used in other embodiments.

In addition, it may be desirable in some embodiments to provide one or more detents in ball joint 46 to facilitate positioning of the head in one or more desired, repeatable positions. For example, in the illustrated embodiment, and as shown in FIGS. 3, 3A and 3B, a spring-loaded ball head screw 52, serving as a pin, may project through a channel formed in magnetic assembly 50 such that a surface of the screw is biased into contact with the surface of ball 44. Ball 44 may then include one or more recesses or dimples 53 at predetermined positions such that, when the head is moved into a position in which screw 52 aligns with a dimple 53, the screw sinks into the dimple to provide the user with feedback that a predetermined position has been achieved, and movement away from that position is resisted based upon the additional force required to overcome the spring bias of the screw. In one embodiment, for example, a dimple 53 may be located at a position that will level head 18 when convertible stand/table 10 is configured as a table.

It will be appreciated that a wide variety of alternate joints, including other ball joint designs, may be used to secure head 18 to arm segment 38. For example, ball joint designs that restrict rotation about the axis of arm segment 38 may be used, as may ball joint designs that restrict movement only in predetermined directions (e.g., along an x-axis and/or a y-axis), may be used. In addition, other mechanisms for varying the freedom of movement for head 18 may be used, including, for example, a user accessible adjustment knob that may be used to loosen the ball joint to permit user adjustment of the head and thereafter tighten the ball joint to secure the head in a fixed position. Other alternatives, including various frictional, magnetic, tensioned or other arrangements, will be apparent to one of ordinary skill in the art having the benefit of the instant disclosure.

Hinges 40, 42 in the illustrated embodiment are locking hinges that are normally biased to a locked configuration that restricts any relative movement between their respective arm segments within a range of angular positions, and that may be selectively actuated to an unlocked configuration that permits relative movement between those respective arm segments. In the illustrated embodiment, hinges 40, 42 are releasable via an arm release 54 including a handle 56 that is pivotable from the normally-biased position illustrated in FIGS. 2-3 toward a top surface of head 18, e.g., by a user pulling the handle forward while facing head 18. In this manner, a user is able to adjust all three arm segments 34-38 of arm 16 at the same time by actuating handle 56, adjusting the arm segments and then releasing handle 56 when the arm segments are properly positioned.

As illustrated in FIG. 3, arm release 54 may be coupled to hinges 40, 42 using one or more flexible Bowden cables 58, each including an outer sleeve 60 and an inner wire 62 that slides within outer sleeve 60. Inner wire 62 projects around a pulley 64 and is secured to handle 56 within a slot 66. Inner wire 62 extends along a cam surface 68 formed on handle 56 such that, when the handle is pivoted in the direction of arrow 70, inner wire 62 is pulled in the direction of arrow 72. Outer sleeve 60 is retained in a fixed position against a ledge 74 formed proximate a clamping arrangement defined by opposing members 76, 78 of a rear panel 80 of head 18, such that when handle 56 is actuated by the user, inner wire 62 will slide within outer sleeve 60.

While only one cable 58 is illustrated in FIG. 3, it will be appreciated that separate cables may be used to actuate hinges 40, 42, with both cables secured to handle 56 and actuated at the same time through the same movement of the handle. In other embodiments, only one cable may be used, and in some embodiments, the hinges may be separately actuated to permit one hinge to be actuated at a time.

Now turning to FIGS. 4 and 5A-5E, an example implementation of a locking hinge 100 is illustrated in greater detail, it being understood that hinge 100 may be used for each of hinges 40, 42 in convertible stand/table 10 of FIGS. 1-3. Hinge 100 in the illustrated embodiment forms an angular indexing adjustable joint with a mechanically-actuated magnetic clutch. In the illustrated embodiment, hinge 100 provides a single action actuation from a long distance and with bidirectional rotational position locking and release, and doing so within a limited space, under heavy loading and with a relatively fine grained range of angular locking intervals (e.g., less than about 12 degrees).

In contrast with other hinge designs, e.g., locking pin arrangements, secondary locking arrangements, electromagnetic locking arrangements, unidirectional locking arrangements, and friction brake locking arrangements, the herein-described locking hinge addresses concerns associated with long moment arms, bi-directional freedom of movement, fine grained locking within a range of movement, small space requirements, and remote actuation, and does so without requiring a source of electrical power.

Hinge 100 includes first and second members, which in the illustrated embodiment are housings 102, 104, each having a sleeve portion 106, 108 configured to slide into the end of a respective arm segment (which may be hollow in the illustrated embodiments). Each housing 102, 104 also includes offset cylindrical portions 110, 112 that mate along annular surfaces 114, 116 to provide for relative rotation of the housings about an axis of rotation 118. An annular ring 120 is integrally formed within an interior of cylindrical portion 110 of housing 102 to partition the interior into inner and outer portions 122, 124. Likewise, an annular ring 126 is integrally formed within an interior of cylindrical portion 112 of housing 104 to partition the interior into inner and outer portions 128, 130.

A magnetic clutch 132 is used to selectively engage and disengage a pair of gears that are respectively coupled to the first and second housings, and that oppose one another along axis of rotation 118 by moving one of the gears generally along the axis of rotation between first and second gear positions. The first gear position is a position in which the gears are intermeshed with one another to restrict relative rotation between the housings, and the second gear position is one in which the gears are axially separated from one another along the axis of rotation to allow for relative rotation between the first and second housings.

In the illustrated embodiment, magnetic clutch 132 is housed within respective inner portions 122, 128 of housings 102, 104 and includes a pair of magnetic members disposed in an opposing relationship, with one magnetic member being movable relative to the other magnetic member between first and second clutch positions, and with the other magnetic member coupled to one of the gears to move the gear between the first and second gear positions. When in the first clutch position, the magnetic members are mutually repellant to move, urge or otherwise apply a force to the gear into the first gear position to restrict relative rotation between the first and second housings. When in the second clutch position, on the other hand, the magnetic members are mutually attractive such that the gear is moved, urged, or otherwise forced into the second gear position to allow for relative rotation between the first and second housings.

Figure 4:
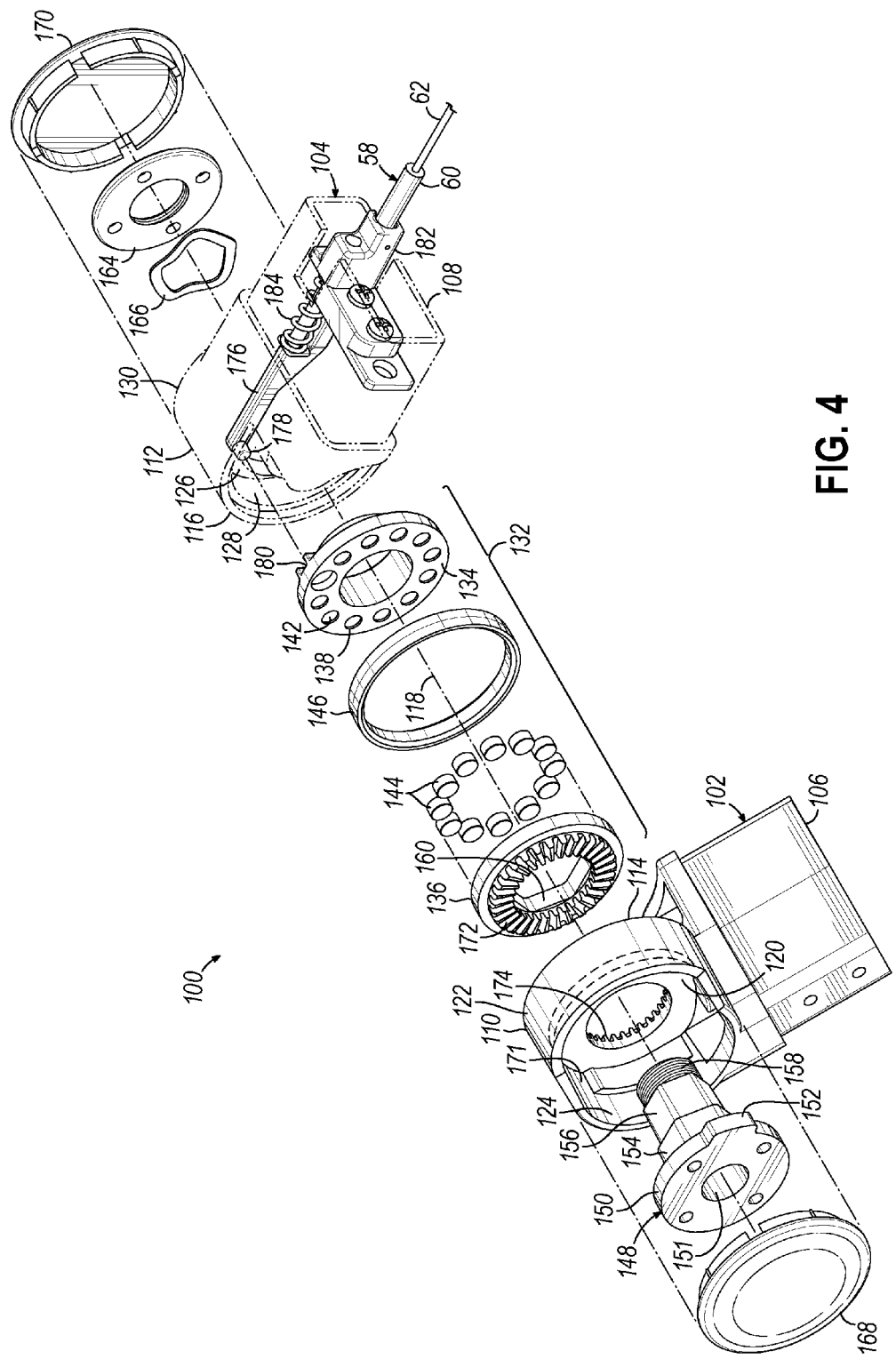
FIG. 4 is an exploded perspective view of a hinge from the convertible/stand table of FIG. 1.

In the illustrated embodiment, the magnetic members are implemented as a magnetic drive wheel 134 and magnetic gear wheel 136, each having an annular array of recesses 138, 140 configured to retain a plurality of (e.g., 12) permanent magnets 142, 144 (magnets 142 are illustrated in FIG. 4 installed within recesses 138, while magnets 144 are illustrated in exploded form). Magnets 142, 144 are substantially equally spaced and arranged in an alternating fashion to provide alternating north and south polarities around the circumference of each wheel 134, 136, such that rotation of drive wheel 134 about axis 118 will alternately orient opposing magnets 142, 144 in mutually attractive or repellent relationships. Various types of permanent magnets, including for example rare earth magnets, ferromagnets, composite magnets, ceramic magnets, etc. may be used. In addition, greater or fewer numbers of magnets (e.g., a few as one magnet) may be used on each magnetic member in other embodiments. For example, one or both of wheels 134, 136 may include a single ceramic magnetic disk instead of an annular array of magnets.

Thus, in the illustrated embodiment, the first and second clutch positions are angular positions about the axis of rotation. In other embodiments, however, magnetic members may be movable relative to one another in other manners, e.g., through linear movement of a pair of magnetic members relative to one another.

A bushing 146 is received within each of inner portions 122, 128, and an axle 148 projects through cylindrical portions 110, 112 and the components of magnetic clutch 132. Axle 148 extends along rotational axis 118, and includes a head 150 with a tab 152 and three axially-separated portions 154, 156 and 158. Portion 154 is keyed (e.g., using a hexagonal cross-section) to receive a complementary keyed channel 160 defined in magnetic gear wheel 136 and thereby restrict rotation of magnetic gear wheel 136 relative to axle 148. As will become more apparent below, portion 154 is of sufficient length to allow magnetic gear wheel 136 to move axially between engaged and disengaged positions along axis 118.

Portion 156 has a smaller diameter than portion 154, but is also keyed (e.g., using a hexagonal cross-section) to receive a complementary keyed channel 162 (FIG. 5C) defined through annular ring 126 of housing 104 to likewise restrict rotation of the axle relative to housing 104, and as such, axle 148, magnetic gear wheel 136 and housing 104 are rotationally fixed relative to one another and are all capable of rotating relative to housing 102 when magnetic clutch 132 disengages the pair of gears.

Portion 158 of axle 148 may be of an even smaller diameter, and may be threaded to engage a threaded lock ring 164 (which is separated axially from housing 104 by a spring washer 166) when the components of hinge 100 are assembled together. Axle 148 may also be retained within hinge 100 in other manners that will be appreciated by one of ordinary skill in the art having the benefit of the disclosure, e.g., via a cotter pin. Covers 168, 170 may also be provided to cover the internal components of hinge 100 and provide an aesthetically pleasing design.

Figure 5A:
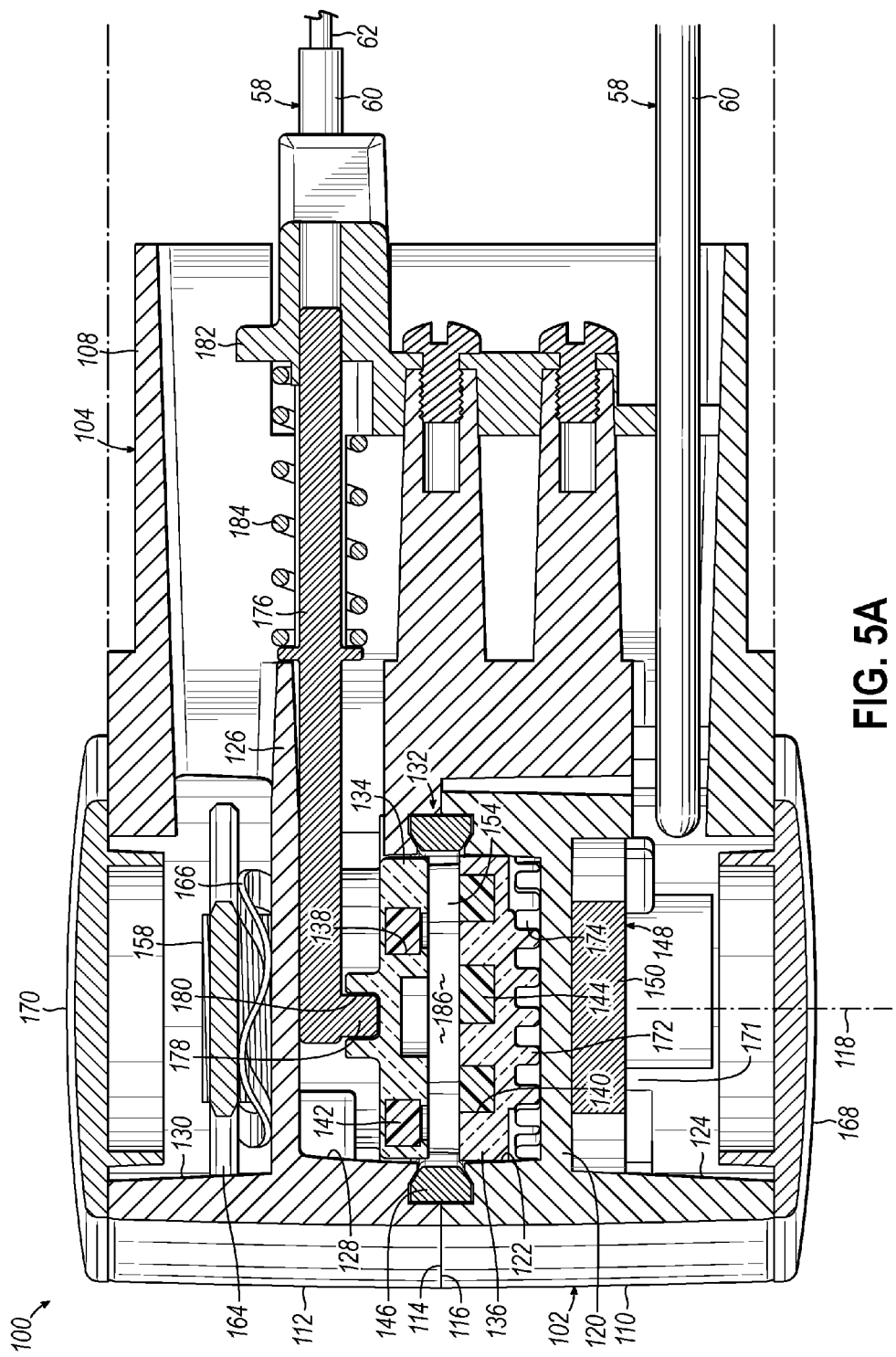
FIGS. 5A and 5B are schematic cross-sectional views of a hinge from the convertible/stand table of FIG. 1, taken along lines 5A-5A thereof, and respectively illustrating the hinge in locked and unlocked positions.
Figure 5B:
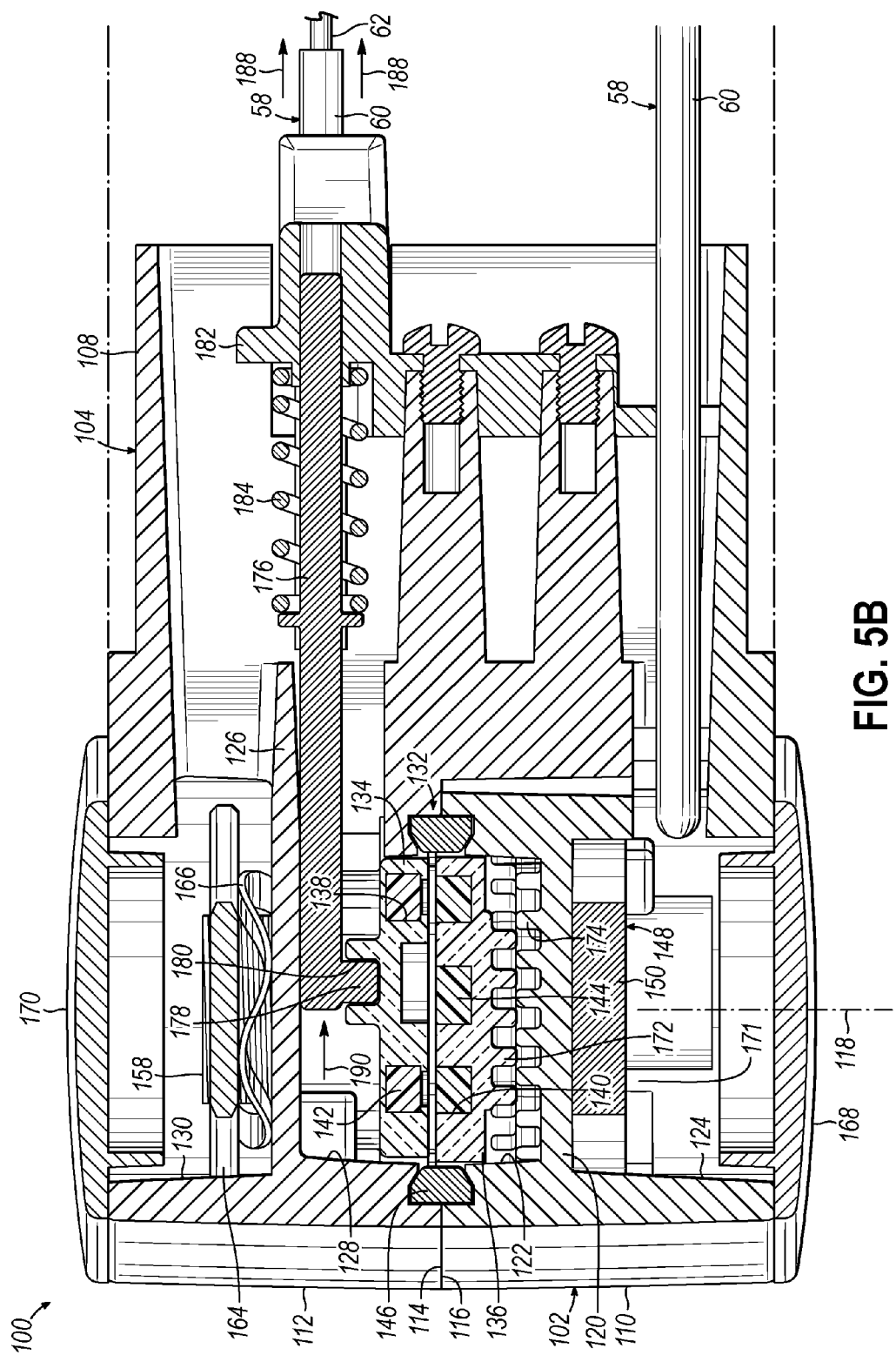
Figure 5C:
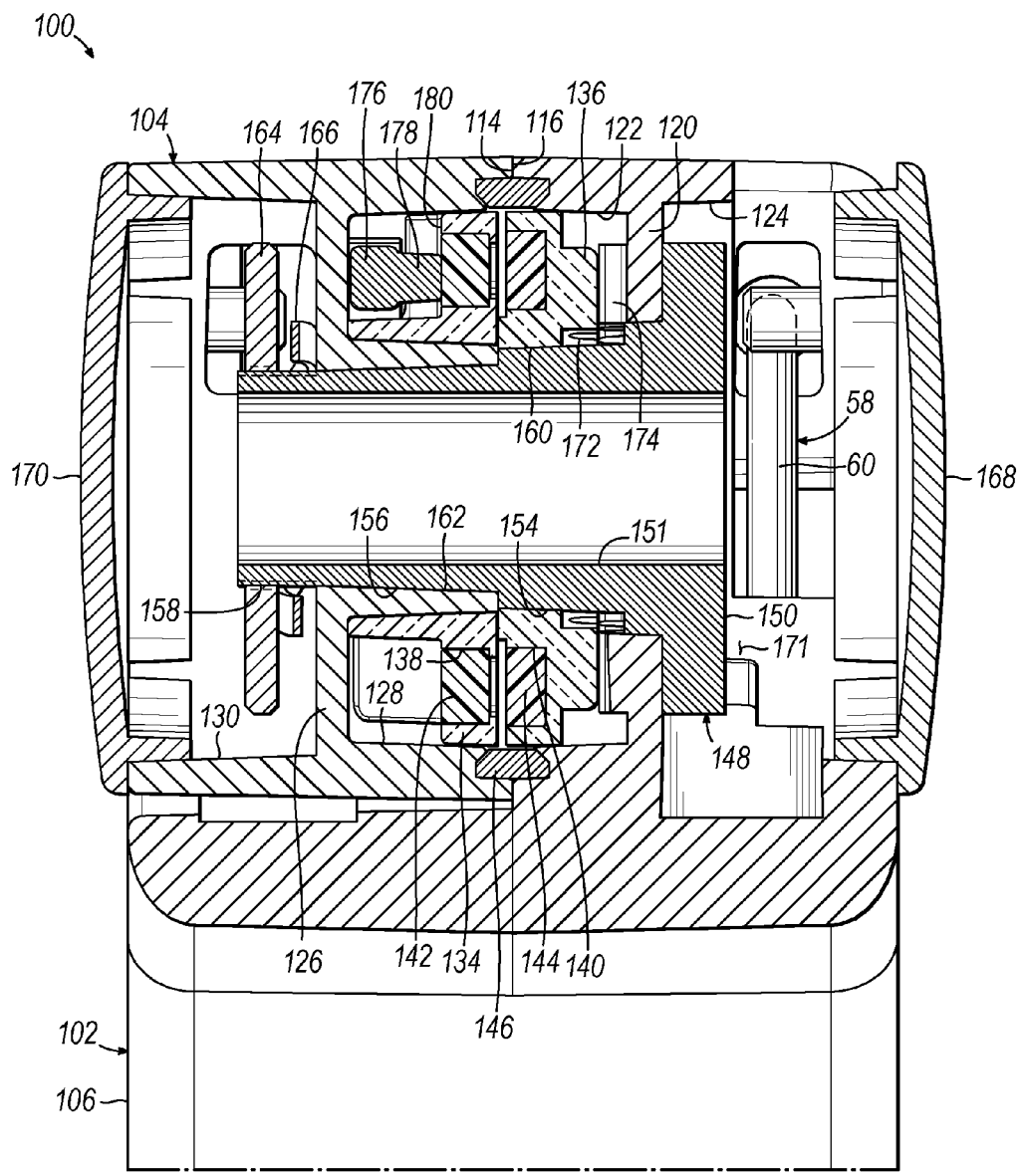
FIG. 5C is a schematic cross-sectional view of a hinge from the convertible/stand table of FIG. 1, taken along lines 5C-5C thereof.
Figure 5D:
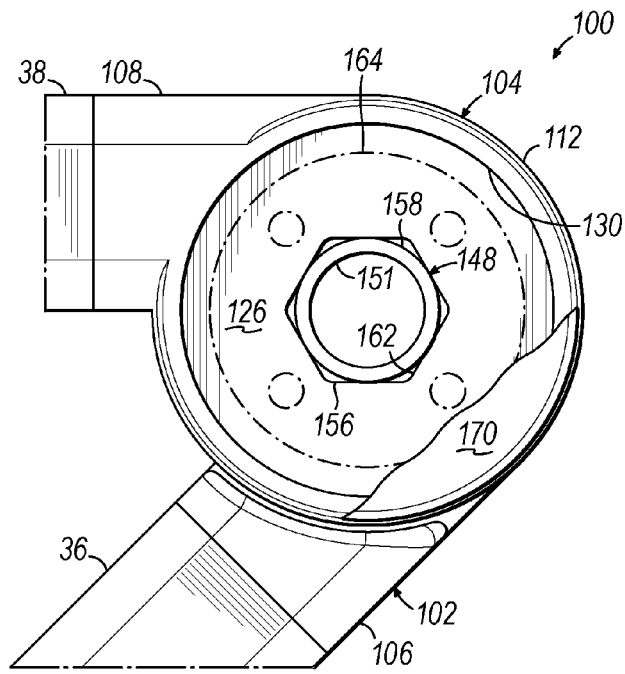
FIGS. 5D and 5E are opposing side elevational views of a hinge from the convertible/stand table of FIG. 1, taken along lines 5A-5A thereof, with portions thereof cut away.

As shown in FIGS. 4 and 5C, axle 148 has an opening or channel 151 extending between the opposing sides of the hinge. In some embodiments, it may be desirable to route a power cable (e.g., power cable 222 of FIG. 3) and/or a Bowden cable 58 through channel 151 such that the cable(s) may extend through the interiors of the respective arm segments coupled to housings 102, 104. Returning to FIGS. 1-2, for example, it will be appreciated that it may be desirable to route power cable 222 through both hinges 40, 42, and additionally route the Bowden cable 58 for hinge 40 through hinge 42. Referring to FIG. 4, the Bowden cable 58 may be routed, for example, into housing 104, into channel 151 of axle 148 at the end proximate lock ring 164, out of channel 151 proximate head 150 of axle 148 and into housing 102.

Figure 5E:
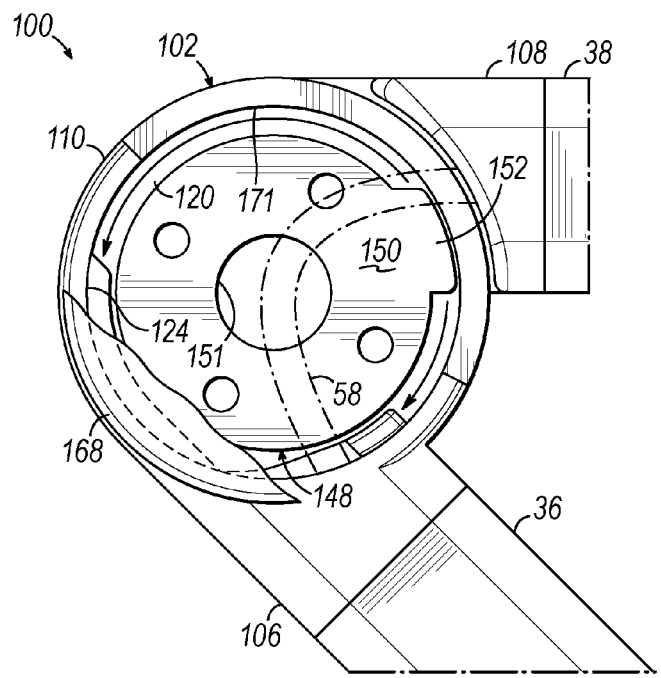

As shown in FIGS. 4 and 5E, tab 152 on axle 148 may be used to restrict the range of motion for hinge 100 by incorporating into outer portion 124 of housing 102 an annular track 171 defined by opposing shoulders formed in outer portion 124 that engage tab 152 at predetermined angular positions and restrict further rotation beyond such positions.

As noted above, a pair of gears are used to selectively restrict relative rotation between housings 102, 104. In the illustrated embodiment, these gears are integrated respectively onto annular ring 120 and magnetic gear wheel 136 of magnetic clutch 132. In particular, as is also shown in FIG. 4, magnetic gear wheel 136 includes an annular arrangement of teeth 172 (e.g., 30 teeth) on an opposite face to that which faces magnetic drive wheel 134 such that the teeth 172 project in an opposite direction along the axis of rotation from the magnetic drive wheel. Teeth 172 are configured to mate with a complementary annular arrangement of teeth 174 formed on an inwardly-facing surface of annular ring 120. In the illustrated embodiment, teeth 172, 174 expand out radially from axis 118, but are configured to mate face to face when magnetic gear wheel 136 is repelled by magnetic drive gear 134.

It will be appreciated, however, that in other embodiments, different gear arrangements may be used. For example, gears may be separately defined from magnetic gear wheel 136 and/or annular ring 120, and coupled thereto via linkages, shafts, control rods, or other mechanical arrangements. As such, the invention is not limited to implementations where the gears are integrated into a housing and/or a component of a magnetic clutch.

Actuation of hinge 100, as noted above, is initiated in response to actuation of handle 56 (FIGS. 2-3), which retracts inner wire 62 of cable 58 out of hinge 100. Wire 62 is coupled to a control member 176 having disposed at a distal end thereof a control pin 178 that projects in a direction generally parallel to axis 118 and that engages a recess 180 formed in magnetic drive wheel 134 to translate linear movement of inner wire 62 into rotational movement of magnetic drive wheel 134. Of note, magnetic drive wheel 134 is not keyed to axle 148, and as such is permitted to rotate freely relative to the axle. Outer sleeve 60 of cable 58 is secured to hinge 100 by a cable mount 182, and a spring 184 biases control member 176 to a position that effectively locks the hinge. It will be appreciated that in other embodiments, alternate arrangements to a linearly-moveable control member may be used, e.g., a rotationally-movable control arrangement.

In operation, and as illustrated in particular in FIG. 5A, when hinge 100 is in a locked state, control member 176 is biased to the left side of the figure, which rotates magnetic drive wheel 134 to the position illustrated in FIG. 5A. In this position, magnets 142, 144 are in a mutually repellant position with magnets of like polarity opposing one another. As such, magnetic gear wheel 136 is biased away from magnetic drive wheel 134 (as represented by gap 186) such that teeth 172 and 174 on magnetic gear wheel 136 and housing 102 mesh with one another and prevent relative rotation therebetween. With magnetic gear wheel 136 keyed to axle 148, which is in turn keyed to housing 104, relative rotation of housings 102, 104 of hinge 100 is restricted, thereby locking the hinge.

Then, as illustrated in FIG. 5B, when inner wire 62 of cable 58 is retracted from hinge 100 as represented by arrows 188, control pin 178 moves in the direction represented by arrow 190, thereby rotating magnetic drive wheel 134 to a position where the opposing magnets 142, 144 are in a mutually attractive position with magnets of opposite polarity opposing one another. As such, magnetic gear wheel 136 is attracted to magnetic drive wheel 134, thereby disengaging teeth 172 from teeth 174 on housing 102 and allowing for relative rotation between housings 102, 104 about axis 118, thereby releasing or unlocking the hinge.

Thereafter, upon release of handle 56 (FIGS. 2-3), magnetic drive wheel 134 rotates back to the position illustrated in FIG. 5A, and since magnetic gear wheel 136 is keyed to housing 104, wheels 134, 136 will once again be in a mutually repellant state, and teeth 172 of magnetic gear wheel 136 will reengage with teeth 174 of housing 102, once again locking the hinge.

Returning now to FIGS. 1-2, it should be noted that hinges 40, 42 may be secured to arm segments 34-38 using screws, bolts or other fasteners with the sleeve portions thereof fitted into the respective arm segments. Other fastening arrangements may be used in other embodiments consistent with the invention.

Head 18 in the illustrated embodiment has a roughly triangular shape with rounded corners and includes a front or top surface 82 formed of a magnetically-attractive surface (i.e., a surface to which a magnet may be attached) such as a surface material (e.g., melamine) laminated to an iron filled rubber sheet, steel, etc. One or more ledges 84 may extend outwardly from a bottom edge of head 18 to support a tablet, other electronic device, book or other item. In addition, a removable, stopper 86, having a magnetic material applied thereto, may be magnetically-retained on head 18 to assist with supporting an item on the surface of the head.

Figure 6:
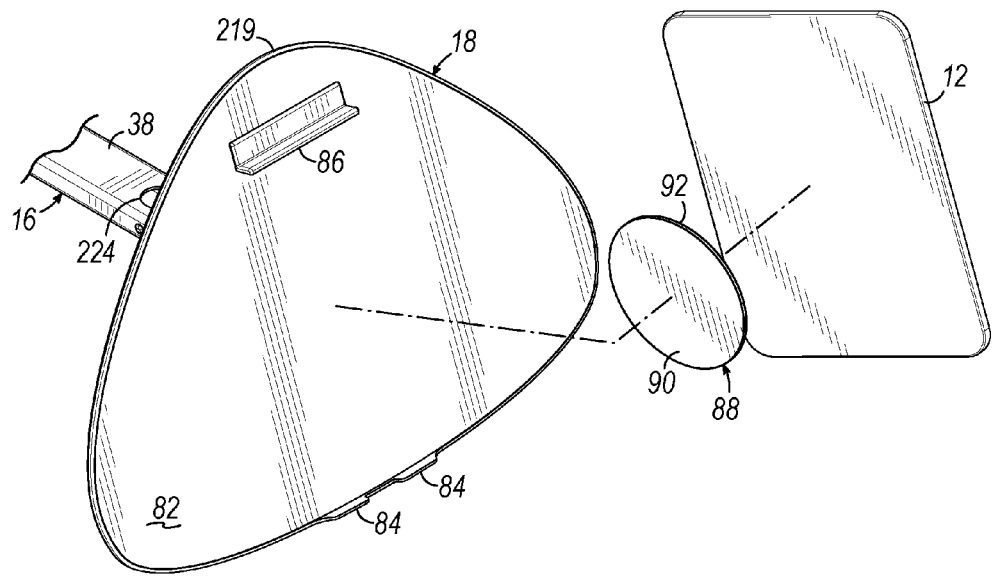
FIG. 6 is a partial perspective view of the convertible stand/table of FIG. 1, illustrating use with a tablet.

In addition, as illustrated in FIG. 6, it may be desirable in some embodiments to utilize a mounting pad 88 to mount tablet 12 or any other suitable item to head 18. In the illustrated embodiment, mounting pad 88 is formed from multiple layers 90, 92 adhered to one another, e.g., through the use of adhesive. Layer 90, which faces head 18, is a magnetic layer formed, for example, from a flexible rubber magnet compound material such as the Y11-07 material available from AIC Engineering Ltd., among other materials. Layer 90 therefore includes at least one permanent magnet and provides magnetic attraction to top surface 82 of head 18. It will be appreciated that in other embodiments, top surface 82 may be magnetized via permanent magnets or through electromagnetism, and layer 90 may not be magnetized but instead may be formed from a magnetically-attractive material.

Layer 92 is a microsuction layer formed, for example, from a flexible microsuction material such as the Regabond-S material available from CBC Co. Ltd., among other materials such as polyurethane. Layer 92 forms a suction cup surface that adheres to the back of tablet 12, and as such, other surfaces, e.g., using one or more distinct suction cups or an array of suction cups may be used as an alternative to a microsuction layer in some embodiments. In still other embodiments, an adhesive layer may be used as an alternative for adhering the mounting pad to the tablet.

In use, mounting pad 88 is mounted to tablet 12 in a semi-permanent manner, with the microsuction layer 92 of mounting pad 88 adhering to the back of the tablet. By virtue of mounting pad 88 being of a relatively thin construction, the pad may be kept on the tablet even when not used with convertible stand/table 10. As a result, whenever it is desirable to use the convertible stand/table with the tablet, a user need only place the tablet on top surface 82, and the magnetic attraction between magnetic layer 90 and top surface 82 will assist with holding tablet 12 on the top surface.

Mounting pad 88 may differ in size for different types of items, e.g., smaller for mobile phones, and in some embodiments may take shapes other than the circular shape illustrated in FIG. 6. In addition, each layer 90, 92 may be implemented in other manners, and in some embodiments, layers 90, 92 may be combined, e.g., by embedding iron filings in a microsuction material.

It will be appreciated that a consumer may purchase or be provided with multiple mounting pads that can be adhered to multiple tablets or other items, such that a convertible stand/table may be used with multiple items at the same time and/or at different times. In addition, it will be appreciated that a tablet or other item may be magnetically mounted on head 18 in other manners. For example, a tablet may be mounted within a case having a magnetic back, or a magnetic surface may be integrated into an item itself.

Figure 7:
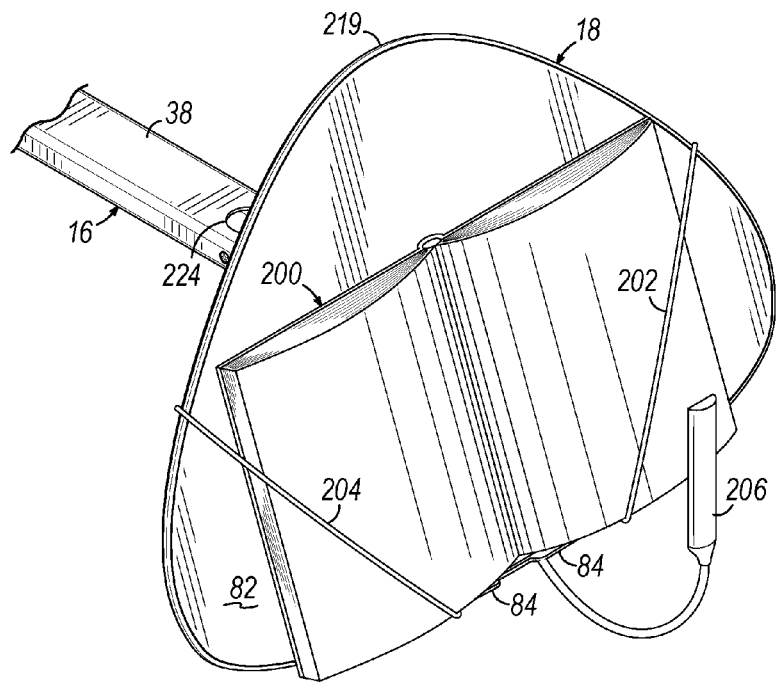
FIG. 7 is a partial perspective view of the convertible stand/table of FIG. 1, illustrating use with a book.

Next, as illustrated in FIG. 7, additional items, e.g., a book 200, may be retained on head 18. Book 200 may be supported by edges 84, and in some embodiments, one or more elastic retaining bands 202, 204 may be used to further retain the book on the head. Further, in some embodiments it may be desirable to provide one or more reading lights 206 (e.g., flexible LED lights) to illuminate the top surface, and thus a book disposed thereon, for use under low light conditions.

Figure 8:
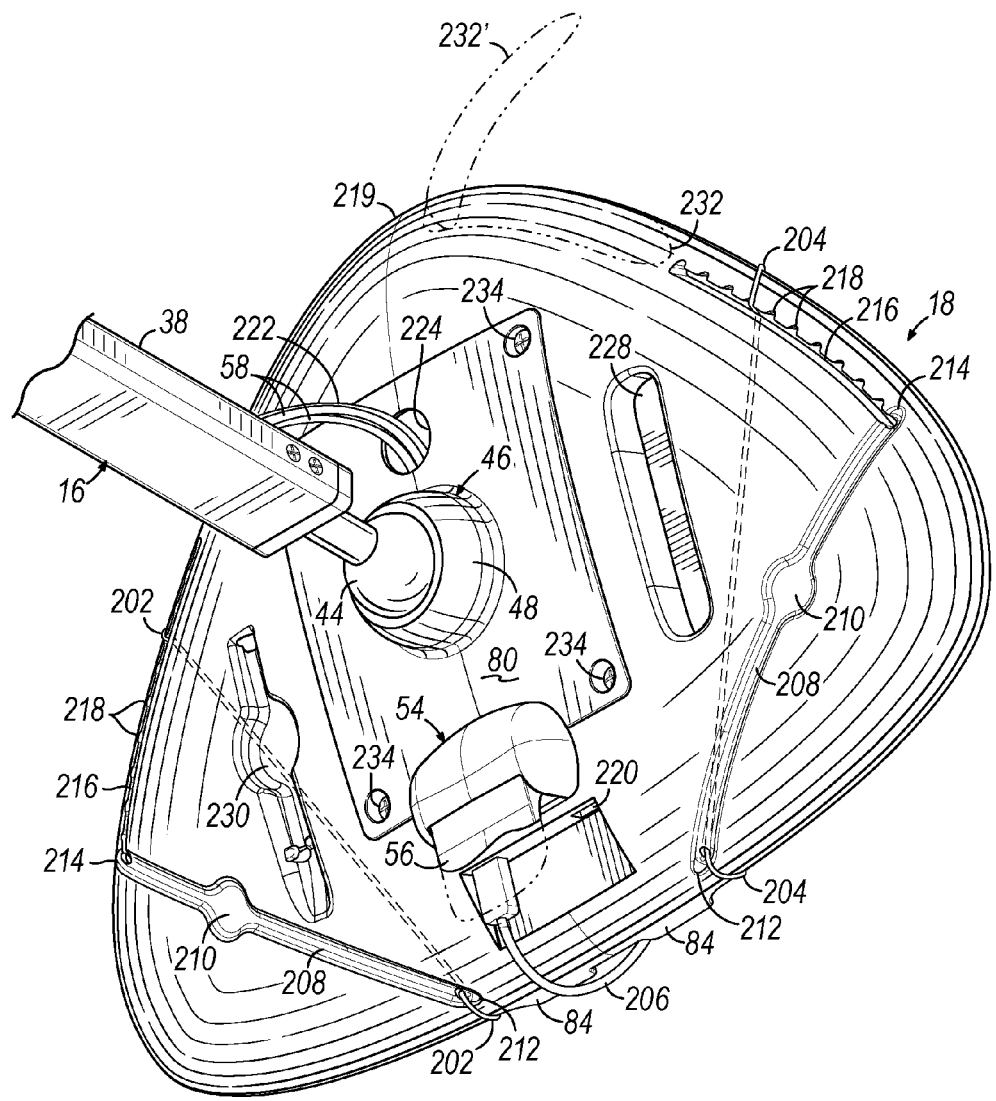
FIG. 8 is a partial perspective view illustrating in the configuration of the back of the head of the convertible stand/table of FIG. 1.

As illustrated in FIG. 8, and with additional reference to FIG. 3, a back side of head 18 may define a rear surface of the head and be provided with a number of additional features to facilitate the aforementioned functionality. For example, recessed channels 208 may be provided on head 18 to store bands 202, 204 when not in use, and one or more enlarged areas 210 may be provided in recesses 208 to facilitate grasping of the bands 202, 204 when stored in the recesses. Each band forms a loop that extends partially through an interior of head 18, passing through an aperture proximate lower end 212 of each recess 208, as well as passing through a slot 216 proximate the upper end 214 of each recess 208. A set of notches 218 are disposed proximate to slot 216 to anchor the respective band 202, 204 at one of a plurality of positions along a top edge 219 of the head to restrict the band 202, 204 from shifting along the top surface of the head. As such, whenever it is desirable to use bands 202, 204 when the bands are stored in slots 208, a user may grab each band and pull it around to the front of head 18 and over the corners of a book or other item. Furthermore, a user may move each band to one of the notches 18 to position each band to a desired position.

In addition, it may be desirable to provide one or more power ports 220, e.g., powered USB-compatible ports, for use in charging items while the items are being used with convertible stand/table 10. In addition, as illustrated in FIG. 8, a power port 220 may serve a secondary function of retaining reading light 206. Power to power ports 220 may be provided in the illustrated embodiment by a power cable 222, which extends through the interior of head 18, exits an opening 224 formed in rear panel 80, and as illustrated in FIGS. 1-3, enters opening 224 of arm segment 38, extends through each arm segment 34-38, each hinge 40, 42, and mount 26, and finally exits mount 26 on base 14, terminating at a connector 226. Cable 222 may be a USB-compatible cable, or in the alternative, may merely provide a suitable source of AC or DC power that is converted to a USB-compatible format by on-board circuitry (not shown) prior to being supplied to power ports 220. Connector 226 may be suitable for connecting, for example, to one or more types of wall chargers/power adapters, e.g., to support the domestic power requirements of various countries around the world.

In other embodiments, cable 222 may enter and/or exit one or more arm segments, e.g., to bypass a hinge 40, 42, or may not be routed through any portion of arm 16 at all. In still other embodiments, one or more releasable connectors may be provided along cable 222, e.g., when it is desirable to fully separate head 18 from the remainder of convertible stand/table 10. Other modifications will be apparent to one of ordinary skill in the art having the benefit of the instant disclosure.

Returning again to FIG. 8, it may also be desirable in some embodiments to provide one or more recessed holders, e.g., holders 228, 230 in the back of head 18. Holder 228 may be configured, for example, to store one or more stoppers 86 while not in use, while holder 230 may be configured to store reading light 206 when not in use.

It will be appreciated that more or fewer holders may be provided on head 18, and that such holders may be specifically configured to store different kinds of items. It will also be appreciated that in some embodiments, head 18 may omit various of the aforementioned features, and may lack, for example, power ports, recessed holders, and/or retaining bands. Furthermore, in other embodiments, head 18 may incorporate other features, e.g., one or more movable members capable of increasing the effective size of head 18 to support larger items. For example, as illustrated in phantom in FIG. 8, it may be desirable to provide one or more rotatable "antennae" 232 capable of being pivoted to a position such as illustrated at 232' to support larger items on head 18. Other types of movable members, including slidable members normally recessed within the interior of head 18, may also be used. Other modifications will be apparent to one of ordinary skill in the art having the benefit of the instant disclosure.

Figure 9:
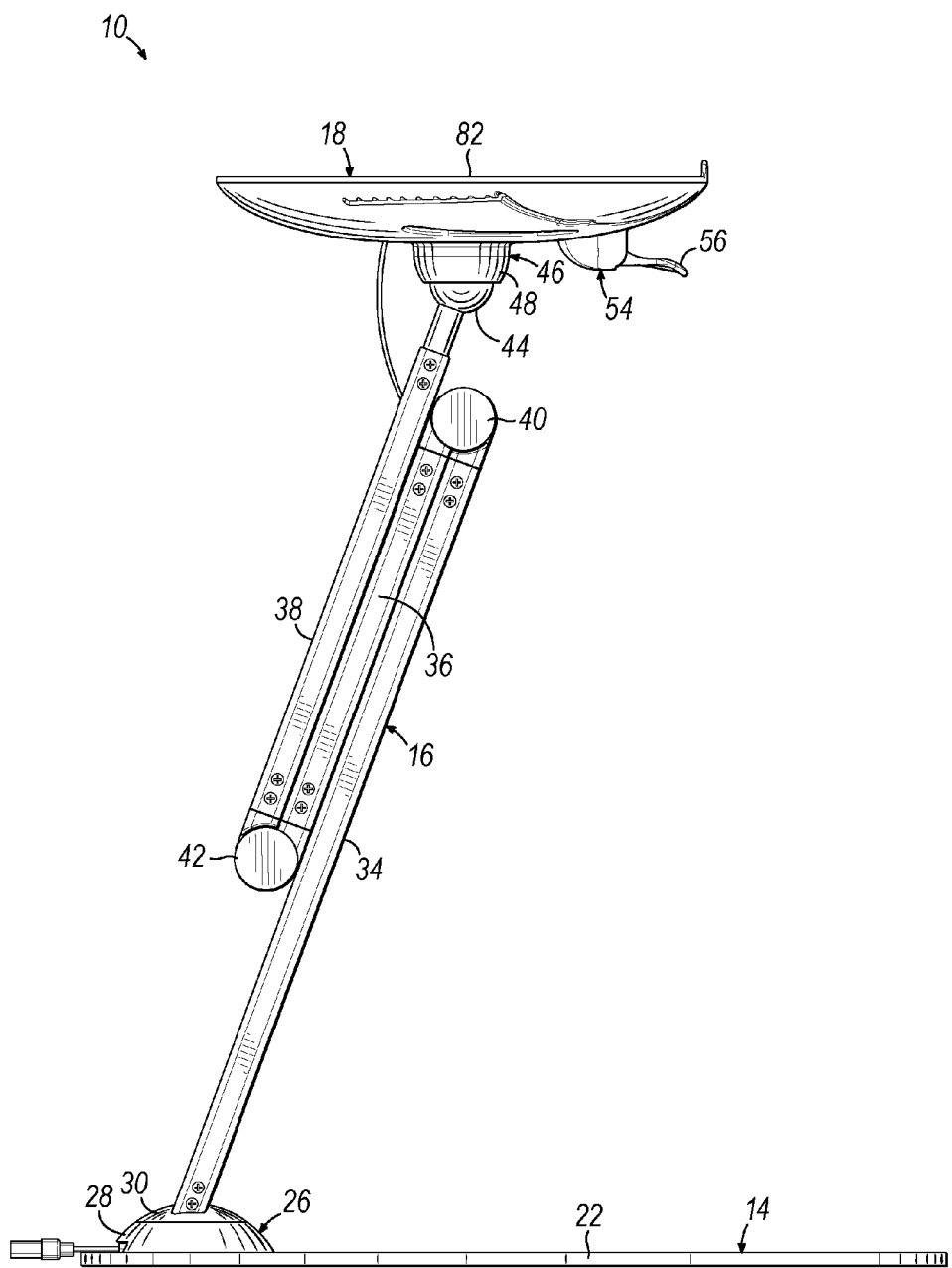
FIG. 9 is a left side elevational view of the convertible stand/table of FIG. 1 in a table configuration.

Now turning to FIG. 9, as noted above convertible stand/table 10 is convertible between at least a stand configuration and a table configuration. A typical stand configuration of convertible stand/table 10 is illustrated in FIGS. 1-2, while FIG. 9 illustrates a typical table configuration where arm segments 34-38 are fully collapsed and extending substantially parallel to one another via hinges 40, 42 to form the base of a table, with head 18 pivoted on ball mount 46 to present as a table top a substantially horizontal upper surface 82 of head 18 upon which items may be placed. As noted above, a user may be assisted in orienting the head in this position through the use of a detent arrangement in ball mount 46.

In the illustrated embodiment, for example, in this configuration upper surface 82 may be about 26 inches (about 66 cm) from the floor. It will be appreciated that differing dimensions may be used in some embodiments, and further that a table configuration may be provided even when arm segments 34-38 are not fully collapsed onto one another, e.g., to vary the height of the table top. In still other embodiments, one or more of arm segments 34-38 may have a variable length to allow for multiple table heights.

Figure 10:
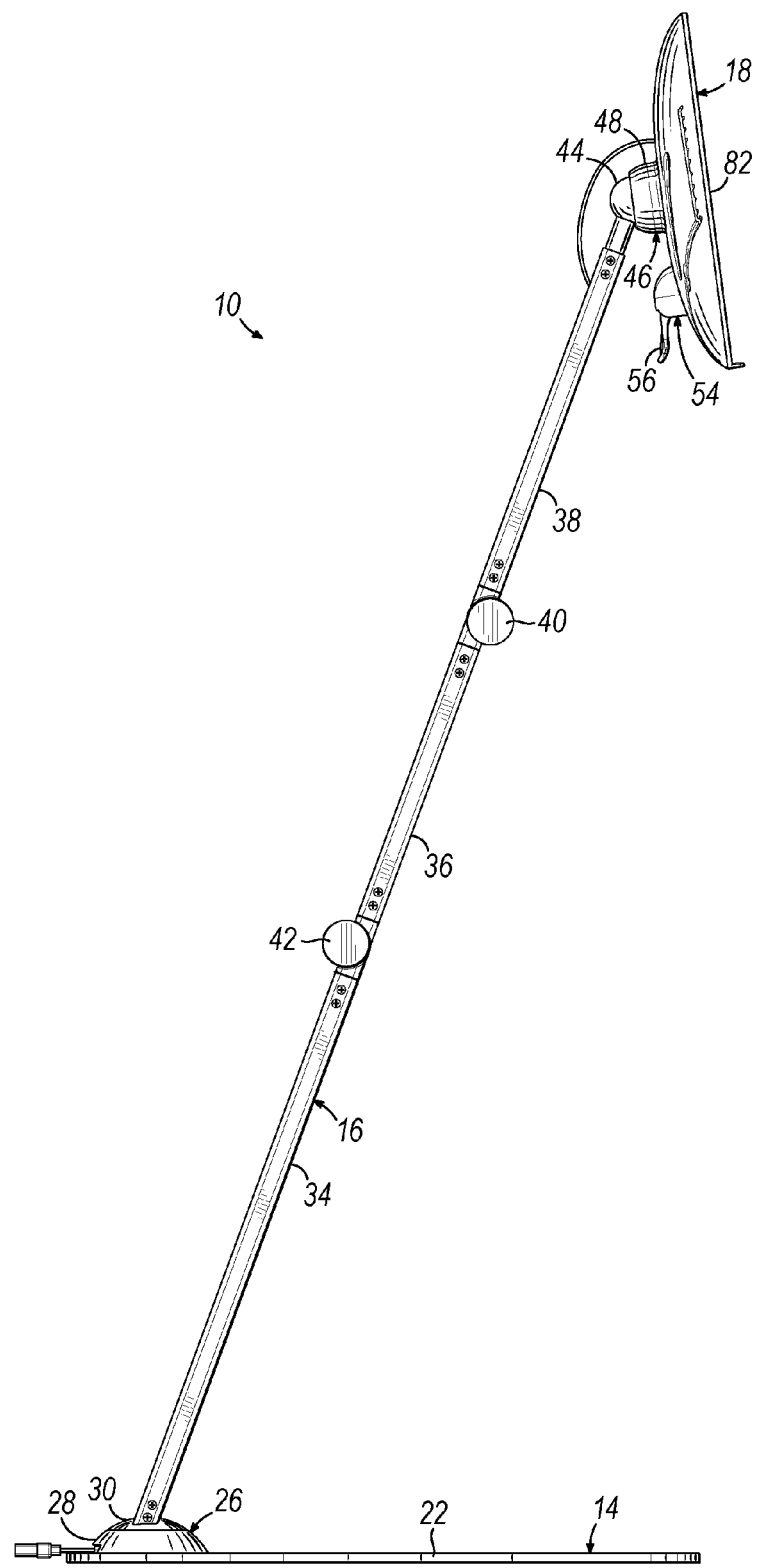
FIG. 10 is a left side elevational view of the convertible stand/table of FIG. 1 in a podium configuration.

While FIG. 9 illustrates a collapsed position suitable for use in a table configuration, FIG. 10 illustrates an extended position of convertible stand/table 10 in which all arm segments 34-48 are collinear with one another, which may be suitable for use, for example, in a podium or music stand configuration, which may be used, for example, to hold a tablet, sheet music, book or other item suitable for use when speaking, singing or playing music.

It will be appreciated that a multitude of other configurations may be supported through the separate configuration of hinges 40, 42, ball mount 46 and mount 26, e.g., for use when standing, sitting, reclining, laying down, etc., as well as when the user is sitting or laying down on various types of furniture, e.g., chairs, sofas, recliners, beds, etc. Additional or fewer joints, hinges, mounts, etc. may be used in different embodiments to either expand or restrict the range of configurations supported. In some embodiments, for example, it may be desirable to restrict the range of configurations to exclude ergonomically-unsuitable reading positions and/or to restrict the inclination of the head to reduce the risk of items falling off (e.g., to maintain the inclination at least about 10-20 degrees offset from vertical).

Figure 11:
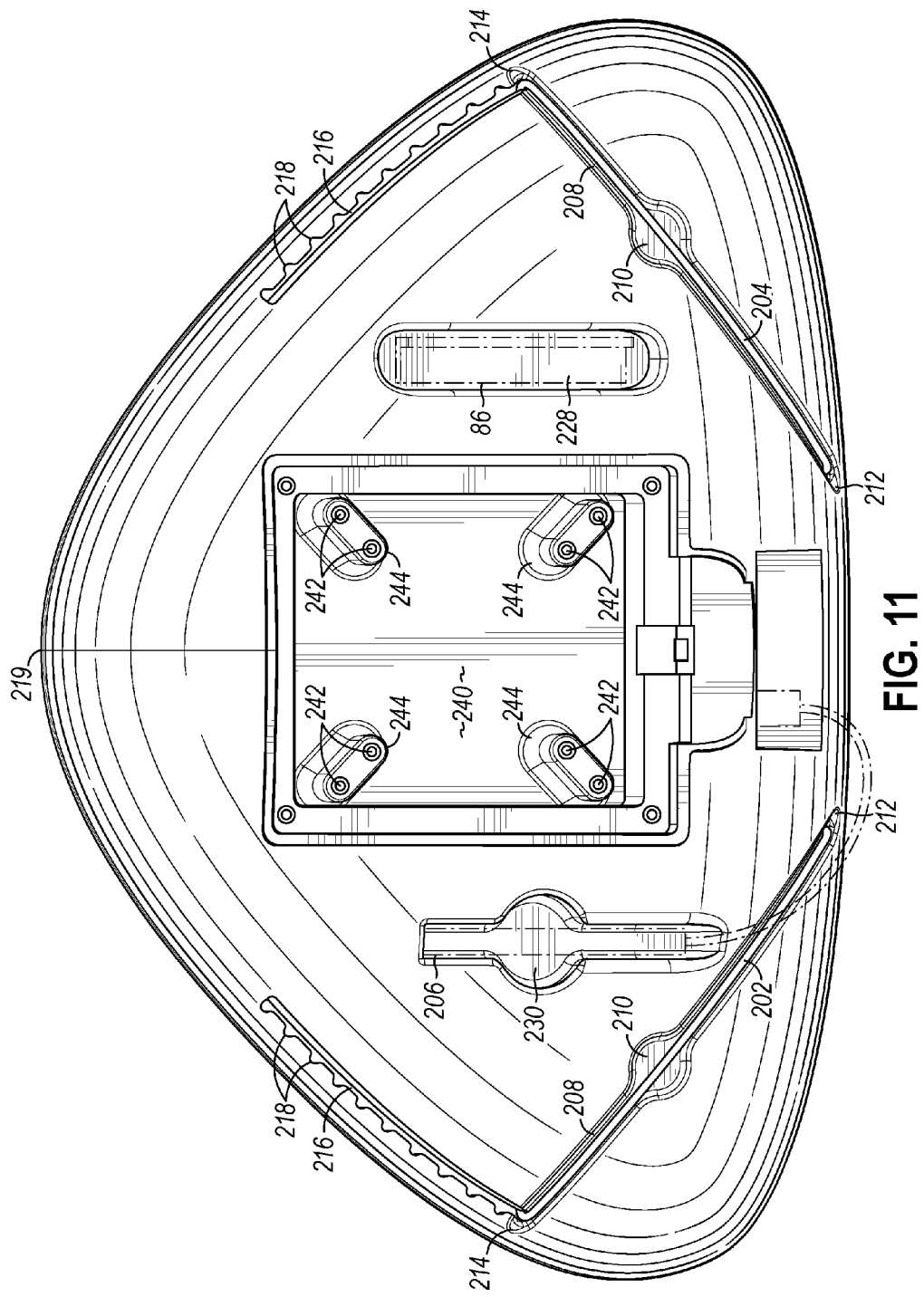
FIG. 11 is a back elevational view of the head of the convertible stand/table of FIG. 1, illustrating a monitor arm mount therefor.

In addition, in some embodiments it may be desirable to utilize the head of a convertible stand/table separate from the base and arms thereof. As shown in FIG. 8, for example, rear panel 80 of head 18 may be removably secured to head 18, e.g., using one or more threaded fasteners 234 as illustrated in FIG. 8. In the alternative, releasable tabs or catches or other releasable or removable configurations may be used to secure the rear panel to the head. Furthermore, as shown in FIG. 11, it may be desirable in some embodiments to provide inside of head 18, e.g., within a recess 240 normally covered by rear panel 80, a monitor or TV mount including a plurality of tapped holes 242 disposed at the ends of pedestals 244 and arranged in an industry-standard configuration, e.g., any of the VESA mounting standards defined by the Video Electronics Standards Association (VESA).

By doing so, a user may detach head 18 from the remaining components of convertible stand/table 10, and attach the head to a standard TV/monitor mount, e.g., a wall mount, a ceiling mount, a desk/table mount, etc. As noted above, it may also be desirable in such circumstances to provide releasable connectors to enable the power cable to be disconnected. In other embodiments, the power ports may be integrated into rear panel 80, or all of the necessary power components may be integrated into head 18, thereby eliminating the need to disconnect the power ports from the power cable. In addition, in some embodiments, a consumer may even be able to purchase head 18 as a separate component without the remaining components of convertible stand/table 10.

In still other embodiments, rear panel 80 may be configured to function in much the same manner as a TV/monitor mount, and may therefore include a VESA-compatible set of holes suitable for mounting to a TV or monitor such that, when head 18 is removed, a TV or monitor may be mounted to rear panel 80, with base 14 and arm 16 supporting the TV or monitor in a similar manner to head 18. As another alternative, the rear panel may be securable to an additional adapter that includes a VESA-compatible set of holes suitable for mounting to a TV or monitor. The adapter, in such a configuration, may have a similar hole pattern to head 18 such that rear panel 80 may be secured to the adapter using the same fasteners used to secure rear panel 80 to head 18.

While particular embodiments have been described, it is not intended that the invention be limited thereto, as it is intended that the invention be as broad in scope as the art will allow and that the specification be read likewise. It will therefore be appreciated by those skilled in the art that yet other modifications could be made without deviating from its spirit and scope as claimed.

What is claimed is:

1. A locking hinge, comprising:
    first and second members coupled to one another for relative rotation about an axis of rotation;
    a first gear coupled to the first member for rotation therewith about the axis of rotation;
    a second gear coupled to the second member for rotation therewith about the axis of rotation and disposed in an opposing relationship with the first gear, wherein the second gear is further movable along the axis of rotation between first and second gear positions, wherein in the first gear position the first and second gears are intermeshed with one another to restrict relative rotation between the first and second members, and in the second gear position the first and second gears are separated from one another to allow for relative rotation between the first and second members;
    a restricting mechanism coupled to the second member and to the second gear to restrict relative rotation between the second gear and the second member; and
    a magnetic clutch including first and second magnetic members disposed in an opposing relationship, each magnetic member including at least one permanent magnet, the first magnetic member being moveable relative to the second magnetic member between first and second clutch positions, the magnetic clutch further including a control arrangement coupled to the first magnetic member and configured to move the first magnetic member between the first and second clutch positions, the second magnetic member coupled to the second gear to move the second gear between the first and second gear positions, wherein in the first clutch position of the first magnetic member, the first and second magnetic members are mutually repellant such that the second magnetic member moves the second gear into the first gear position to restrict relative rotation between the first and second members, and in the second clutch position of the first magnetic member, the first and second magnetic members are mutually attractive such that the second magnetic member moves the second gear into the second gear position to allow for relative rotation between the first and second members.

2. The locking hinge of claim 1, wherein the first and second members respectively comprise first and second housings, the housings including respective offset cylindrical portions configured to mate with one another along respective annular surfaces thereof with the axis of rotation projecting therethrough.

3. The locking hinge of claim 2, wherein the first housing includes an annular surface disposed in the offset cylindrical portion thereof in a substantially perpendicular plane to the axis of rotation, and wherein the first gear comprises an annual ring of teeth disposed on the annular surface substantially facing the offset cylindrical portion of the second housing.

4. The locking hinge of claim 1, wherein the restricting mechanism includes an axle extending along the axis of rotation and coupled to the second member for rotation therewith about the axis of rotation.

5. The locking hinge of claim 4, wherein the axle includes at least first and second axially-separated portions, the first portion keyed to receive the second gear and the second portion keyed to receive the second member to restrict relative rotation between the axle, the second gear and the second member about the axis of rotation.

6. The locking hinge of claim 5, wherein the axle further includes a head, the head having a tab configured to rotate along an annular track defined on the first member to restrict a range of movement between the first and second members about the axis of rotation.

7. The locking hinge of claim 6, wherein the axle further includes a threaded, third axially-separated portion, the threaded, third axially-separated portion disposed at an opposite end of the axle from the head, and wherein the restricting mechanism further comprises a threaded locking ring configured to threadably engage the axle with the axle projecting along the axis of rotation and through the first and second members and the first and second gears.

8. The locking hinge of claim 1, wherein the first and second magnetic members respectively comprise first and second magnetic wheels configured for rotation about the axis of rotation, wherein the first and second clutch positions of the first magnetic member respectively comprise first and second angular positions about the axis of rotation.

9. The locking hinge of claim 8, wherein the first and second magnetic wheels each include at least one region of a first magnetic polarity and at least one region of a second magnetic polarity, wherein in the first clutch position at least one region of the first magnetic polarity on the first magnetic wheel substantially opposes at least one region of the first magnetic polarity on the second magnetic wheel, and wherein in the second clutch position at least one region of the first magnetic polarity on the first magnetic wheel substantially opposes at least one region of the second magnetic polarity on the second magnetic wheel.

10. The locking hinge of claim 9, wherein the first and second magnetic wheels each include an annular array of permanent magnets, each annular array including a plurality of permanent magnets arranged to present alternating polarities about the axis of rotation.

11. The locking hinge of claim 10, wherein each annular array includes twelve permanent magnets alternately presenting north and south polarities and substantially equally spaced around the respective annular array, and wherein the first and second angular positions are separated by about 30 degrees.

12. The locking hinge of claim 8, wherein the second gear is disposed on a face of the second magnetic wheel and projects in an opposite direction along the axis of rotation from the first magnetic wheel.

13. The locking hinge of claim 8, wherein the control arrangement includes a control member movable linearly between first and second positions and coupled to the first magnetic wheel to rotate the first magnetic wheel between the first and second angular positions, wherein the control member is biased to the first position to bias the first magnetic wheel to the first angular position.

14. The locking hinge of claim 13, wherein the control arrangement further includes a recess in the first magnetic wheel, wherein the control member is configured to couple with an inner wire of a Bowden cable, and wherein the control member includes a control pin proximate a distal end thereof and configured to engage the recess in the first magnetic wheel.

15. The locking hinge of claim 12, wherein each of the first and second gears comprises an annular ring of teeth.

16. The locking hinge of claim 15, wherein each of the first and second gears includes 30 teeth.

17. An apparatus, comprising:
a base;
an arm supported by the base and comprising a plurality of arm segments;
a head including a top surface, the head pivotably mounted to the arm at an opposite end from the base, the head being pivotable to a position inclined relative to horizontal and configured to support a portable electronic device in an ergonomically-suitable viewing position; and
a remotely-actuatable locking hinge coupling first and second arm segments among the plurality of arm segments to one another in response to actuation of a handle coupled to the head, the locking hinge comprising:
first and second members respectively coupled to the first and second arm segments and coupled to one another for relative rotation about an axis of rotation;
a first gear coupled to the first member for rotation therewith about the axis of rotation;
a second gear coupled to the second member for rotation therewith about the axis of rotation and disposed in an opposing relationship with the first gear, wherein the second gear is further movable along the axis of rotation between first and second gear positions, wherein in the first gear position the first and second gears are intermeshed with one another to restrict relative rotation between the first and second members, and in the second gear position the first and second gears are separated from one another to allow for relative rotation between the first and second members;
a restricting mechanism coupled to the second member and to the second gear to restrict relative rotation between the second gear and the second member; and
a mechanically-actuated magnetic clutch mechanically coupled to the handle and including first and second magnetic members disposed in an opposing relationship, each magnetic member including at least one permanent magnet, the first magnetic member being moveable relative to the second magnetic member between first and second clutch positions in response to actuation by the handle, the mechanically-actuated magnetic clutch further including a control arrangement coupled to the first magnetic member and configured to move the first magnetic member between the first and second clutch positions, the second magnetic member coupled to the second gear to move the second gear between the first and second gear positions, wherein in the first clutch position of the first magnetic member, the first and second magnetic members are mutually repellant such that the second magnetic member moves the second gear into the first gear position to restrict relative rotation between the first and second members, and in the second clutch position of the first magnetic member, the first and second magnetic members are mutually attractive such that the second magnetic member moves the second gear into the second gear position to allow for relative rotation between the first and second members.

18. The apparatus of claim 17, wherein the first and second magnetic members respectively comprise first and second magnetic wheels configured for rotation about the axis of rotation, wherein the first and second clutch positions of the first magnetic member respectively comprise first and second angular positions about the axis of rotation.

19. The apparatus of claim 18, wherein the second gear is disposed on a face of the second magnetic wheel and projects in an opposite direction along the axis of rotation from the first magnetic wheel.

20. The apparatus of claim 18, wherein the control arrangement comprises a control member movable linearly between first and second positions and coupled to the first magnetic wheel to rotate the first magnetic wheel between the first and second angular positions, wherein the control member is biased to the first position to bias the first magnetic wheel to the first angular position, the apparatus further comprising a Bowden cable coupled between the handle and the control member.

* * * * *